(12) United States Patent
Kwak et al.

(10) Patent No.: US 11,669,202 B2
(45) Date of Patent: Jun. 6, 2023

(54) TOUCH CIRCUIT FOR PROCESSING TOUCH-ASSOCIATED DATA, ELECTRONIC DEVICE COMPRISING TOUCH CIRCUIT, AND METHOD FOR OPERATING SAME

(71) Applicant: Samsung Electronics Co., Ltd., Gyeonggi-do (KR)

(72) Inventors: Sanghun Kwak, Gyeonggi-do (KR); Daehyun Yoo, Gyeonggi-do (KR); Bongjun Ko, Gyeonggi-do (KR); Mansung Kim, Gyeonggi-do (KR); Jaeho Lee, Gyeonggi-do (KR); Junghoon Choi, Gyeonggi-do (KR); Changjin Kim, Gyeonggi-do (KR); Sangheon Park, Gyeonggi-do (KR); Jongdae Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/432,275

(22) PCT Filed: Feb. 17, 2020

(86) PCT No.: PCT/KR2020/002243
§ 371 (c)(1),
(2) Date: Aug. 19, 2021

(87) PCT Pub. No.: WO2020/171511
PCT Pub. Date: Aug. 27, 2020

(65) Prior Publication Data
US 2022/0187942 A1 Jun. 16, 2022

(30) Foreign Application Priority Data

Feb. 19, 2019 (KR) .................. 10-2019-0019511
Jul. 19, 2019 (KR) .................. 10-2019-0087699
Dec. 26, 2019 (KR) .................. 10-2019-0175776

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01)

(58) Field of Classification Search
CPC ...... G06F 3/0418; G06F 3/044; G06F 3/0446; G06F 3/04166; G06F 3/04186;
(Continued)

(56) References Cited

U.S. PATENT DOCUMENTS

2013/0176273 A1 7/2013 Li et al.
2014/0176498 A1 6/2014 Yanase et al.
(Continued)

FOREIGN PATENT DOCUMENTS

JP 2012-150747 A 8/2012
KR 10-2013-0049758 A 5/2013
(Continued)

OTHER PUBLICATIONS

European Search Report dated Apr. 4, 2022.

*Primary Examiner* — Adam R. Giesy
(74) *Attorney, Agent, or Firm* — Cha & Reiter, LLC

(57) ABSTRACT

According to an embodiment, an electronic device may include: a processor; and a touch circuit configured to output, to the processor, information associated with a touch on at least one surface of the electronic device. The touch circuit may be configured to: generate first raw data including a first value associated with capacitance for each of multiple channels of the touch circuit; generate a first baseline on the basis of the first raw data; identify whether the first raw data satisfies a designated condition; and
(Continued)

identify whether the first baseline is reset, on the basis of whether the raw data satisfies the designated condition.

29 Claims, 31 Drawing Sheets

(58) Field of Classification Search
CPC ............ G06F 2203/04101; G06F 2203/04111; G06F 2201/81; G06F 2201/815
See application file for complete search history.

(56) References Cited

U.S. PATENT DOCUMENTS

| | | | |
|---|---|---|---|
| 2014/0218333 A1* | 8/2014 | Wang | ............ G06F 3/0443 345/174 |
| 2015/0062061 A1 | 3/2015 | Hsu et al. | |
| 2015/0103042 A1 | 4/2015 | Lee et al. | |
| 2015/0145835 A1 | 5/2015 | Vandermeijden | |
| 2016/0216825 A1 | 7/2016 | Forutanpour | |
| 2016/0274720 A1 | 9/2016 | Shin | |
| 2017/0168639 A1 | 6/2017 | Imai et al. | |
| 2017/0228099 A1 | 8/2017 | Miyahara et al. | |
| 2019/0095036 A1 | 3/2019 | Bokma et al. | |
| 2019/0361570 A1 | 11/2019 | Takagi et al. | |

FOREIGN PATENT DOCUMENTS

| | | |
|---|---|---|
| KR | 10-2013-0081673 A | 7/2013 |
| KR | 10-2014-0094165 A | 7/2014 |
| KR | 10-1416724 B1 | 7/2014 |
| KR | 10-2020-0101254 A | 8/2020 |
| WO | 2018-168320 A1 | 9/2018 |

\* cited by examiner

| | RX₁ | RX₂ | | | | | | | | | | | | | | | | RX₁₉ ~510 |
|---|---|---|---|---|---|---|---|---|---|---|---|---|---|---|---|---|---|---|
| TX₁ | 17 | 20 | 18 | 17 | 15 | 15 | 13 | 15 | 14 | 16 | 18 | 14 | 16 | 18 | 17 | 18 | 12 | 12 | 10 | 7 |
| TX₂ | 23 | 20 | 20 | 19 | 17 | 19 | 17 | 16 | 20 | 16 | 20 | 14 | 18 | 17 | 14 | 12 | 14 | 12 | 8 |
| | 19 | 20 | 18 | 17 | 3 | 3 | 15 | 17 | 2 | 0 | 2 | 4 | 4 | 2 | 13 | -1 | 10 | -2 | -2 | -2 | 13 |
| | 7 | 8 | 8 | 5 | 11 | 11 | 3 | 1 | 10 | 8 | 10 | 10 | 9 | 8 | -1 | 8 | 4 | 5 | 3 | 6 | -1 |
| | 13 | 14 | 13 | 11 | 7 | 7 | 11 | 9 | 10 | 12 | 8 | 10 | 5 | 10 | 8 | 10 | 8 | 3 | 7 | 6 | 5 |
| | 13 | 14 | 11 | 13 | 8 | 13 | 7 | 8 | 10 | 12 | 8 | 8 | 3 | 6 | 8 | 4 | 6 | 5 | 5 | 2 | 3 |
| | 11 | 10 | 9 | 9 | 7 | 7 | -1 | 6 | 2 | 8 | 6 | 4 | 1 | 4 | 4 | -1 | -1 | -1 | -1 | -1 | -1 |
| | 13 | 10 | 13 | 7 | 8 | 8 | 3 | 6 | 6 | 8 | 8 | 6 | 3 | -1 | 1 | -1 | -1 | -1 | -1 | -1 | -1 |
| | 14 | 11 | 10 | 5 | 7 | 6 | 7 | 8 | 4 | 6 | 8 | 2 | 3 | 3 | 3 | -1 | -1 | -1 | -1 | -1 | -1 |
| | 12 | 9 | 10 | 11 | -1 | 8 | 6 | 6 | 8 | 4 | 4 | 3 | -3 | 3 | -3 | -1 | -1 | 3 | 3 | 3 | -3 |
| | 10 | 11 | 9 | 3 | 3 | 6 | 8 | 8 | 6 | 6 | 4 | 4 | 1 | 1 | -1 | 1 | -1 | -1 | -1 | -1 | -1 |
| | 12 | 7 | 10 | 7 | 7 | 8 | 0 | 7 | 1 | 8 | 2 | 2 | 3 | 3 | 3 | 0 | 0 | 0 | 3 | 3 | -1 |
| | 13 | 12 | 9 | 9 | 9 | 8 | 7 | 5 | 5 | 6 | 4 | 4 | -1 | 5 | 2 | -1 | 2 | 2 | 2 | -1 | -1 |
| | 11 | 10 | 11 | 7 | 7 | 10 | 9 | 6 | 7 | 4 | 2 | 2 | 3 | -1 | 2 | 2 | 0 | 0 | 2 | 3 | -1 |
| | 11 | 8 | 9 | 9 | 7 | 6 | 3 | 6 | 5 | 6 | 4 | 4 | 5 | 3 | 4 | 0 | 2 | 2 | 0 | -3 | -1 |
| TX₁₇ | 8 | 10 | 7 | 5 | 5 | 10 | 6 | 6 | 7 | 8 | 10 | 6 | 3 | 3 | 6 | 7 | 6 | 3 | 0 | 1 | 1 |

TOUCH CIRCUIT FOR PROCESSING TOUCH-ASSOCIATED DATA, ELECTRONIC DEVICE COMPRISING TOUCH CIRCUIT, AND METHOD FOR OPERATING SAME

CROSS REFERENCE TO RELATED APPLICATIONS

This application is a National Phase Entry of PCT International Application No. PCT/KR2020/002243, which was filed on Feb. 17, 2020 and claims priority to Korean Patent Application Nos. 10-2019-0019511, 10-2019-0087699, and 10-2019-0175776, filed on Feb. 19, 2019, Jul. 19, 2019, and Dec. 26, 2019, respectively, in the Korean Intellectual Property Office, the disclosures of which are incorporated herein by reference in their entireties.

TECHNICAL FIELD

The instant disclosure generally relates to a touch circuit for processing touch-related data, an electronic device including the touch circuit, and an operation method thereof.

BACKGROUND ART

An electronic device including a touchscreen may identify the position (coordinates) of a touch input to the touchscreen. A touch sensor integrated circuit (IC) included in the touchscreen may identify the position of the touch based on a difference between raw data obtained from a touch sensor and a baseline used as a reference. The baseline may have per-channel (or per-node) values. The touch sensor IC may identify differences between a plurality of per-channel (or per-node) raw data and the baseline. The baseline may be set to be different depending on the state of the electronic device, in particular, the state of the display.

Accordingly, the electronic device may set (or change) the baseline if the state of the display is changed. For example, the electronic device may set (or change) the baseline if the display is switched from an on state to an off state. Alternatively, the electronic device may set (or change) the baseline if the display is switched from the off state to the on state.

DETAILED DESCRIPTION OF THE INVENTION

Technical Problem

Since the electronic device resets the baseline if the state of the display is changed, if noise is present when the state of the display is changed, the reset baseline may contain noise. For example, if the display is switched from the on state to the off state while the touch is maintained, the newly set baseline may contain noise caused by the touch.

The disclosure is intended to address the foregoing or other issues, and may provide a touch circuit capable of identifying whether a baseline is generated in the presence of noise, an electronic device including the touch circuit, and an operation method thereof.

Technical Solution

According to an embodiment, an electronic device comprises a processor, and a touch circuit configured to output, to the processor, information associated with a touch to at least one surface of the electronic device, and the touch circuit may be configured to generate first raw data including a first value associated with capacitance for each of a plurality of channels of the touch circuit, generate a first baseline based on the first raw data, identify whether the first raw data meets a designated condition, and identify whether to reset the first baseline based on whether the designated condition is met.

According to an embodiment, a method for operating an electronic device including a touch circuit and a processor may comprise generating first raw data including a first value associated with capacitance for each of a plurality of channels of the touch circuit, by the touch circuit, generating a first baseline based on the first raw data, by the touch circuit, identifying whether the first raw data meets a designated condition, by the touch circuit, and identifying whether to reset the first baseline based on whether the designated condition is met, by the touch circuit.

According to an embodiment, an electronic device comprises a processor, and a touch circuit configured to output, to the processor, information associated with a touch to at least one surface of the electronic device, and the touch circuit may be configured to generate first raw data including a value associated with a capacitance for each of a plurality of channels of the touch circuit at a first time, generate a baseline based on the first raw data, generate second raw data including the value associated with the capacitance for each of the plurality of channels of the touch circuit at a second time, process, in a first scheme, data corresponding to each of a first channel and a second channel among the second raw data, based on a difference between data individually corresponding to the first channel and the second channel adjacent to each other among the first raw data being not more than a threshold, and process, in a second scheme, the data corresponding to each of the first channel and the second channel among the second raw data, based on the difference between data respectively corresponding to the first channel and the second channel adjacent to each other among the first raw data exceeding the threshold.

According to an embodiment, an electronic device comprises a processor, and a touch circuit configured to output, to the processor, information associated with a touch to at least one surface of the electronic device, and the touch circuit may include a plurality of transmission channels corresponding to a plurality of transmission electrodes arranged in a first direction and a plurality of reception channels corresponding to a plurality of reception electrodes arranged in a second direction orthogonal to the first direction, and the touch circuit may be configured to generate signal data based on values associated with capacitances of nodes where the plurality of transmission electrodes cross the plurality of reception electrodes, the signal data including data corresponding to each of the nodes, identify whether the signal data meets a designated condition, discard the signal data in response to the signal data meeting the designated condition, and output, to the processor, the information associated with the touch to the at least one surface of the electronic device based on the signal data in response to the signal data failing to meet the designated condition.

According to an embodiment, an electronic device comprises a processor and a touch circuit configured to output, to the processor, information associated with a touch to at least one surface of the electronic device, and the touch circuit may be configured to obtain first raw data including a first value associated with capacitance for each of a plurality of channels of the touch circuit, obtain signal data based on the first raw data and a current first baseline, and identify whether to reset the first baseline based on whether the signal data meets a designated condition.

Advantageous Effects

According to certain embodiments, there may be provided a touch circuit capable of identifying whether a baseline is generated in the presence of noise, an electronic device including the touch circuit, and an operation method thereof. When the baseline is generated in the presence of noise, it is possible to reset the baseline, thereby increasing the accuracy of the touch input.

According to certain embodiments, there may be provided a touch circuit in which signal data may identify the user's unintentional touch, an electronic device including the touch circuit, and an operation method thereof. When the user's unintentional touch occurs, it is possible to disable the touch input, thus preventing an erroneous touch.

According to certain embodiments, there may be provided a touch circuit capable of changing a baseline reset time or changing the baseline using various characteristic data of a touch, an electronic device including the touch circuit, and an operation method thereof. It is possible to prevent malfunction due to touch by analyzing various characteristic data of the touch and stopping resetting the baseline or, after resetting, changing to a pre-stored baseline.

According to certain embodiments, there may be provided an electronic device for adjusting parameters for touch sensing and determining whether there is an erroneous touch using sensing information obtained from other sensors and an operation method thereof. It is possible to achieve more accurate touch recognition by adjusting parameters based on the sensitivity changed depending on a change in temperature and considering sensing information obtained from other sensors, together with data obtained from the touch circuit.

BRIEF DESCRIPTION OF DRAWINGS

FIG. 5A is a view illustrating raw data according to an embodiment;

FIG. 7B is a view illustrating raw data according to an embodiment;

FIG. 13A is a view illustrating signal data according to an embodiment;

FIG. 13C is a view illustrating signal data according to an embodiment;

FIG. 16A is a view illustrating signal data according to an embodiment;

FIG. 16B is a view illustrating signal data according to an embodiment;

MODE FOR CARRYING OUT THE INVENTION

Figure 1:
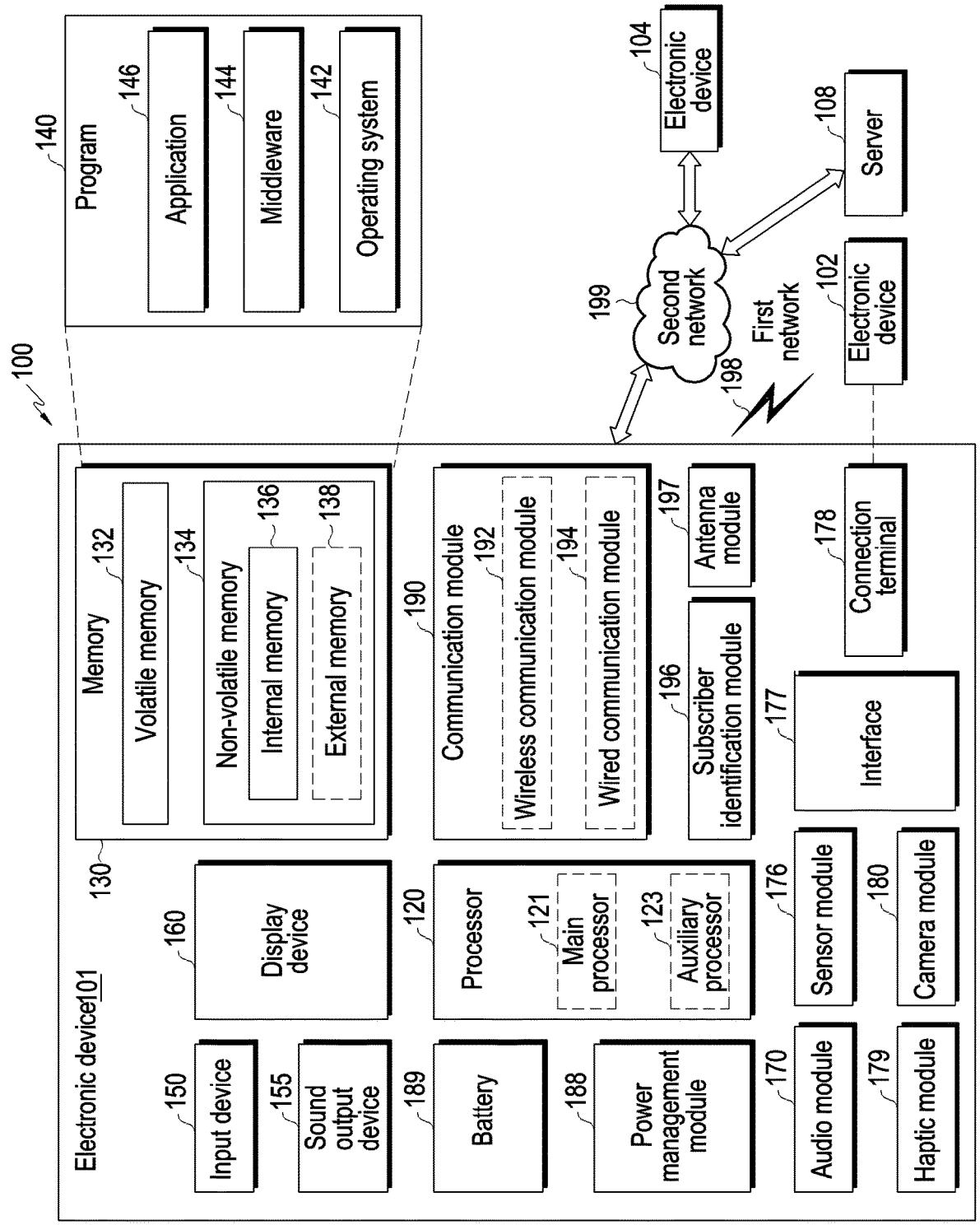
FIG. 1 is a block diagram illustrating an electronic device 101 in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include a touch circuit adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
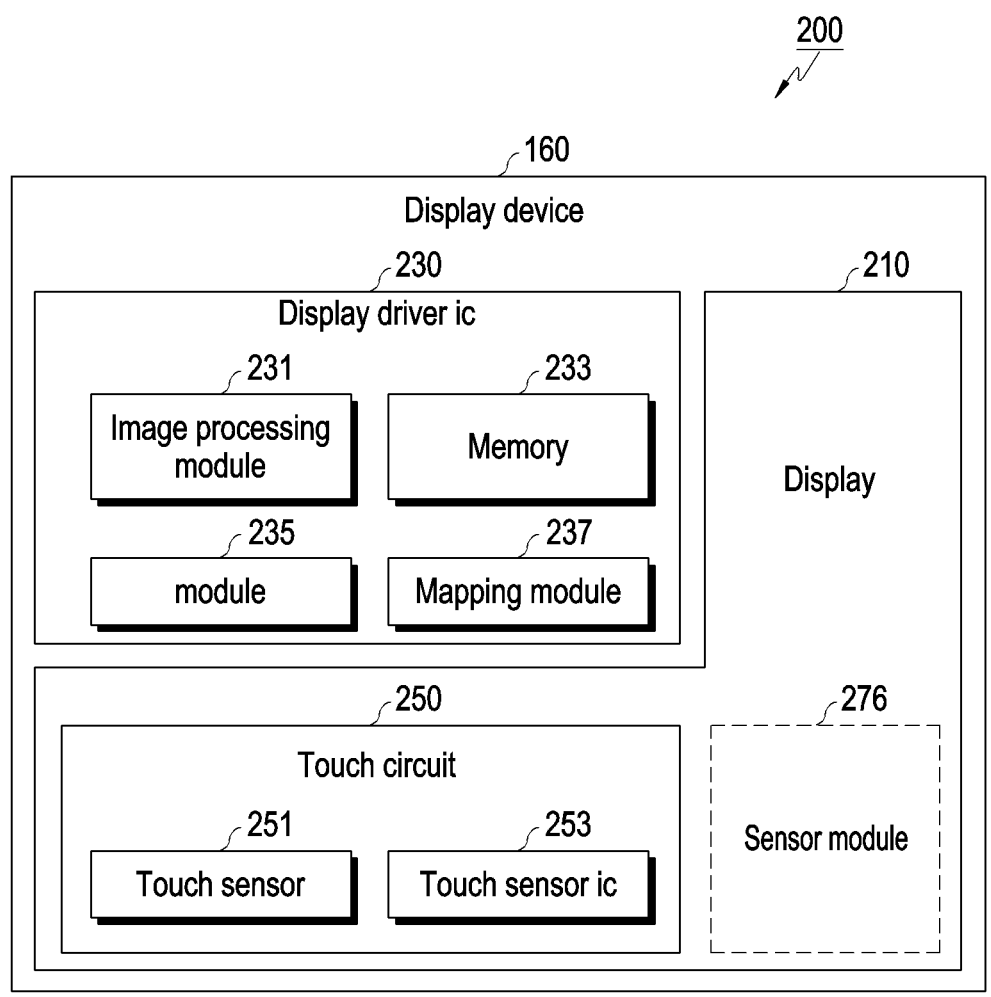
FIG. 2 is a block diagram illustrating a display device according to an embodiment.

FIG. 2 is a block diagram 200 illustrating the display device 160 according to an embodiment. Referring to FIG. 2, the display device 160 may include a display 210 and a display driver integrated circuit (DDI) 230 to control the display 110. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with a touch circuit 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 135. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuit 250. The touch circuit 250 may include a touch sensor 251 and a touch sensor IC 253 to control the touch sensor 151. The touch sensor IC 253 may control the touch sensor 251 to sense a touch input or a hovering input with respect to a certain position on the display 210. To achieve this, for example, the touch sensor IC 253 may detect (e.g., measure) a change in a signal (e.g., a voltage, a quantity of light, a resistance, or a quantity of one or more electric charges) corresponding to the certain position on the display 210. The touch sensor IC 253 may provide input information (e.g., a position, an area, a pressure, or a time) indicative of the touch input or the hovering input detected to the processor 120. According to an embodiment, at least part (e.g., the touch sensor IC 253) of the touch circuit 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuit 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
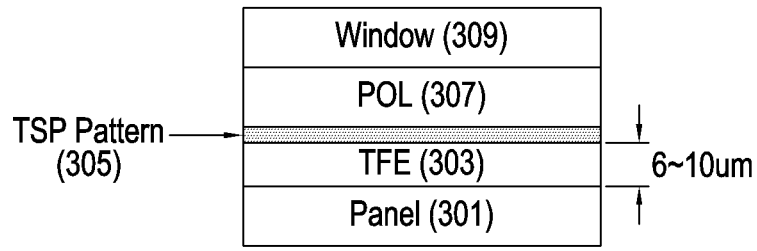
FIG. 3 is a view illustrating a structure of a display according to an embodiment.

FIG. 3 is a view illustrating a structure of a display according to an embodiment. As illustrated in FIG. 3, a display (e.g., the display 210) may have a structure in which a thin film encapsulation (TFE) layer 303 and a touch electrode layer (TSP pattern) 305 are deposited on a panel 301, and a polarizer (POL) 307 and a window 309 are deposited thereon. In this case, the distance between the panel 301 and the touch electrode layer 305 may be 6 μm or more and 10 μm or less. The display may implement a touchscreen by implementing a sensor in the touch electrode layer 305 between the thin film encapsulation (TFE) layer 303 and the polarizer (POL) 307.

Figure 4:
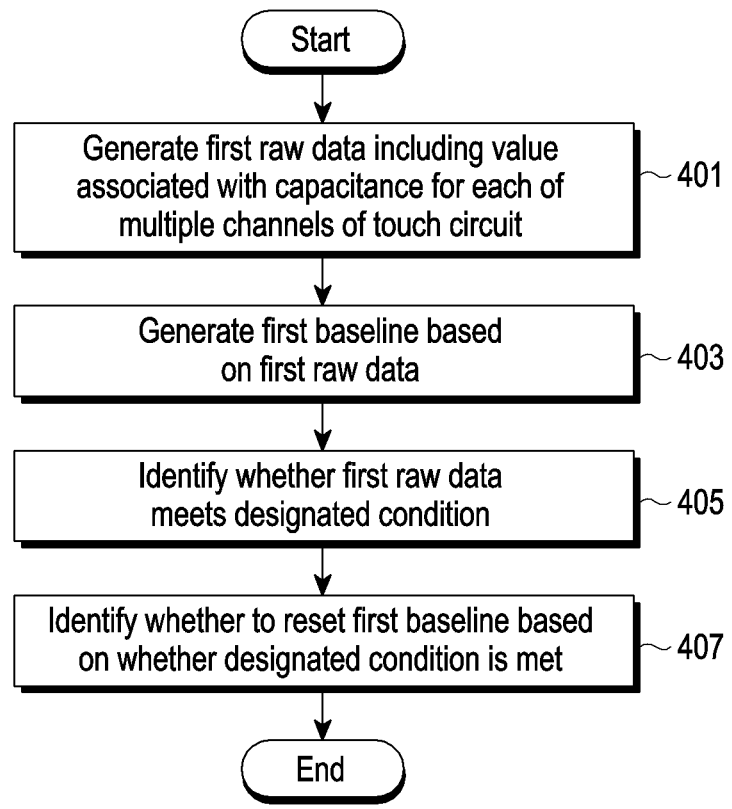
FIG. 4 is a flowchart illustrating an operation method of an electronic device according to an embodiment.
Figure 5B:
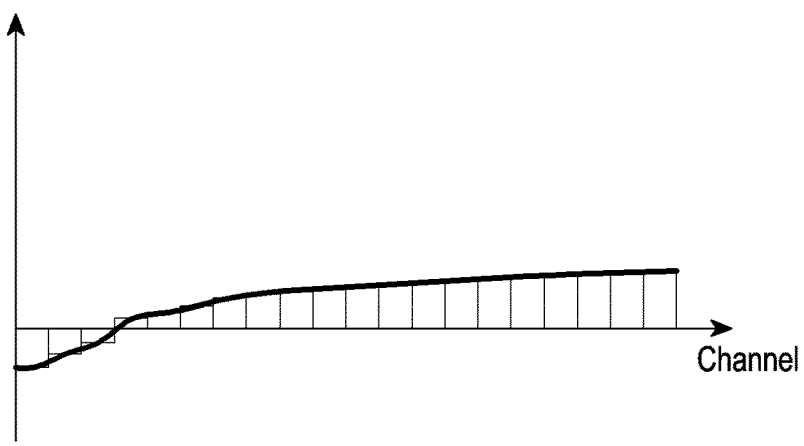
FIG. 5B is graphs illustrating baselines under various conditions according to an embodiment.
Figure 5B:
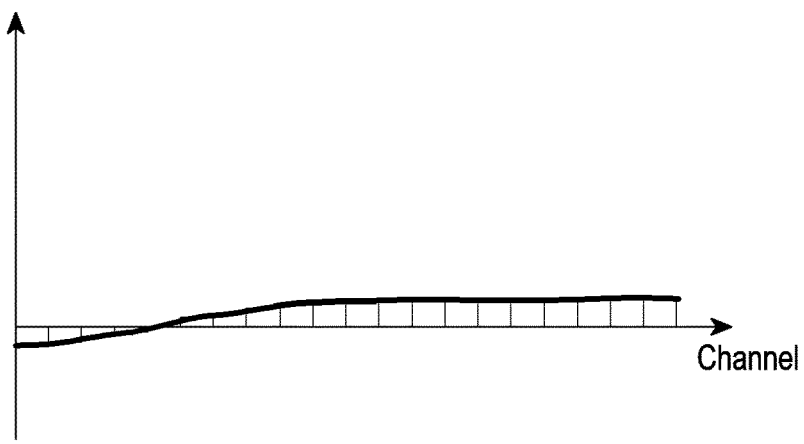
Figure 5B:
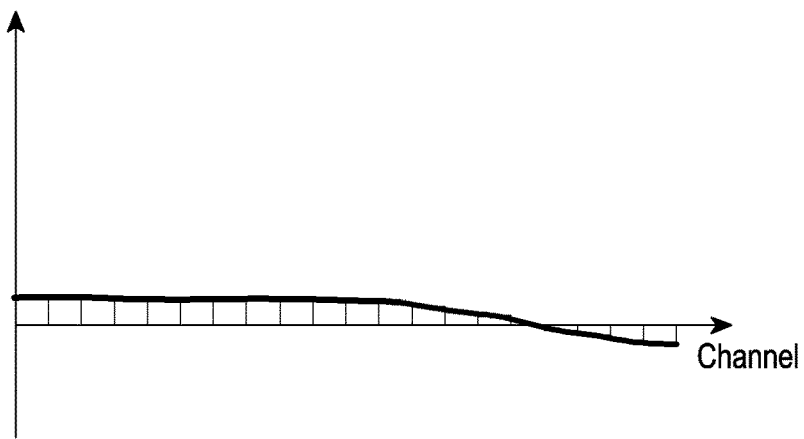

FIG. 4 is a flowchart illustrating an operation method of an electronic device according to an embodiment. The embodiment related to FIG. 4 is described in greater detail with reference to FIGS. 5A-5B. FIG. 5A is a view illustrating raw data according to an embodiment. FIG. 5B is graphs illustrating baselines under various conditions. The various operations of FIG. 4 are not limited in order and, in the flowchart of FIG. 4, a subsequent operation may be performed earlier than its preceding operation. Further, at least some of the various operations of FIG. 4 may be at least simultaneously performed. Further, another operation not shown in FIG. 4 may intervene between two adjacent operations of FIG. 4. Alternatively, at least one of the operations of FIG. 4 may not be performed. What has been described above may apply likewise to other flowcharts of the instant disclosure. In the instant disclosure, when the electronic device 101 performs a specific operation, it may mean that a hardware device (e.g., the touch circuit 250) in the electronic device 101 performs the specific operation. In this case, the hardware device (e.g., the touch circuit 250) by itself may perform the specific operation by a control circuit (e.g., the touch sensor IC 253) in the hardware device. Alternatively, when the electronic device 101 performs a specific operation, it may mean that the processor 120 performs the specific operation or a hardware device (e.g., the touch sensor IC 253, the display driver IC 230, or the display 210) performs the specific operation based on the control of the processor 120. Alternatively, when the electronic device 101 performs a specific operation, it may mean that an instruction to enable the processor 120 or a hardware device other than the processor 120 to perform the specific operation is executed. In this case, performing a specific operation may mean that an instruction to enable the specific operation to be performed is stored in the memory 130.

Referring to FIG. 4, in operations 4, the electronic device 101 (e.g., the touch circuit 250) may generate first raw data including values associated with a plurality of per-channel capacitances. For example, the touch circuit 250 may include a plurality of transmission channels and a plurality of reception channels that cross each other. When the plurality of transmission channels and the plurality of reception channels cross, it may mean that transmission electrodes connected to the transmission channels are arranged in a first direction, and reception electrodes connected to the reception channels are arranged in a second direction perpendicular to the first direction so that the transmission electrodes and the reception electrodes cross each other. In this case, the touch circuit 250 may receive an electrical signal from each of the reception channels, and based thereupon, identify the capacitance formed between the transmission channel and the reception channel. For example, the electrical signal is an analog signal and may be converted into a digital signal. The raw data may be a digital signal itself or data (e.g., capacitance values) generated based on the digital signal. The raw data may include a plurality of per-channel (or per-node) values. For example, as illustrated in FIG. 5A, the touch circuit 250 may include first to seventeenth transmission channels Tx1 to Tx17 arranged in the first direction and first to nineteenth reception channels Rx1 to Rx19 arranged in the second direction. When the transmission channels are arranged in the first direction, it may mean that the transmission electrodes connected to the transmission channels are arranged in the first direction. When the reception channels are arranged in the second direction, it may mean that the reception electrodes connected to the reception channels are arranged in the second direction. The values in FIG. 5A may be values indicating the capacitances formed between the first to seventeenth transmission channels Tx1 to Tx17 and the first to nineteenth reception channels Rx1 to Rx19 by power sequentially provided to each of the first to seventeenth transmission channels Tx1 to Tx17. For example, the electronic device 101 may generate the values of FIG. 5A as raw data. Alternatively, the electronic device 101 may generate only some of the values of FIG. 5A as raw data. For example, the electronic device 101 may generate, as raw data, data 510 based on the capacitance obtained from each of the first to nineteenth reception channels Rx1 to Rx19 for the power supplied to the first transmission channel Tx1.

In operation 403, the electronic device 101 (e.g., the touch circuit 250) may generate a first baseline based on the first raw data. When the baseline is generated, it may mean that raw data is set as the baseline. For example, the electronic device 101 may set raw data first generated after the mode of the display device 160 (e.g., the display 210) is switched, as the baseline. When the mode of the display device 160 is switched, it may mean that the display device 160 is switched from an on mode to an off mode or is switched from the off mode to the on mode. For example, (a) of FIG. 5B may be a baseline generated when the display device 160 is on and displaying a white screen. (b) of FIG. 5B may be a baseline generated when the display device 160 is on and displaying a black screen. (c) of FIG. 5B may be a baseline generated when the display device 160 displays a white screen and is turned off. As such, the electronic device 101 may generate different baselines according to modes of the display device 160. In an embodiment, the electronic device 101 (e.g., the touch circuit 250) may reset the baseline based on previously obtained raw data if the mode is changed.

Alternatively, the electronic device 101 may set the raw data generated after an event is caused by an external factor, as the baseline. For example, the event caused by the external factor may be connection of a charger, earjack, or USB to the electronic device 101, creation of RF noise, or the detection of the user's grip or a change in the user's grip. Alternatively, the electronic device 101 may generate raw data at preset periods and use those data as the baseline.

In operation 405, the electronic device 101 (e.g., the touch circuit 250) may identify whether the first raw data meets a designated condition. Since the electronic device 101 has set the first raw data as a new baseline in operation 403, operation 405 may be understood as identifying, by the electronic device 101, whether the new baseline meets a designated condition. For example, the designated condition may be a condition for determining whether the first raw data is generated while the touch is maintained on the touch circuit 250. In other words, the designated condition may be, e.g., a condition capable of determining whether the first raw data, i.e., the first baseline, may include a value that would cause an error. For example, if the difference between data corresponding to first and second channels adjacent to each other in the first raw data exceeds a threshold, the electronic device 101 may identify that the first raw data meets the designated condition. A detailed description of the designated conditions is given below.

In operation 407, the electronic device 101 (e.g., the touch circuit 250) may identify whether to reset the first baseline based on whether the designated condition is met. The electronic device 101 may identify to reset the first baseline if the designated condition is met, and may identify not to reset the first baseline if the designated condition is not met. Accordingly, if the designated condition is met, that is, if it is determined that an error has occurred in the first baseline, the electronic device 101 (e.g., the touch circuit 250) may reset the first baseline to exclude the error.

Figure 6:
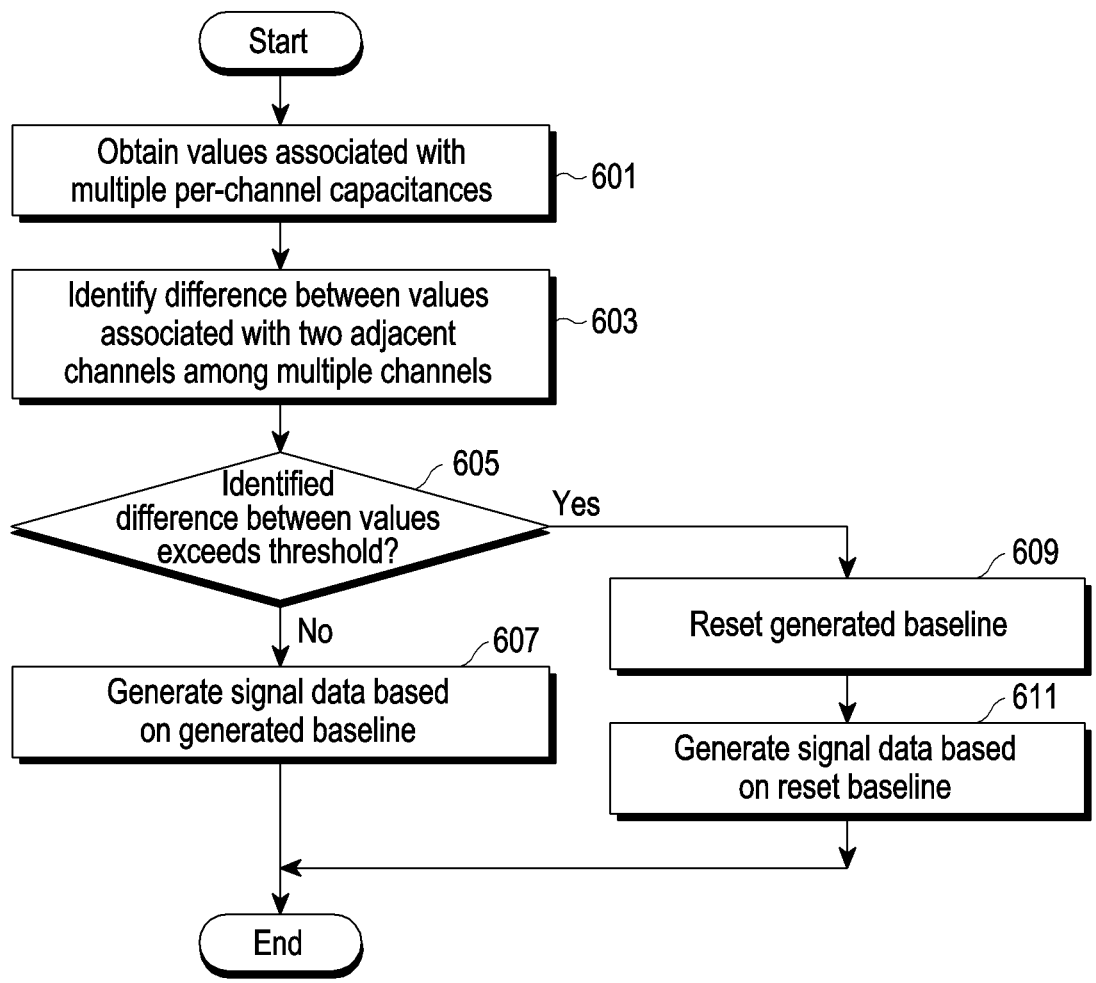
FIG. 6 is a flowchart illustrating an operation method of an electronic device according to an embodiment.
Figure 7A:
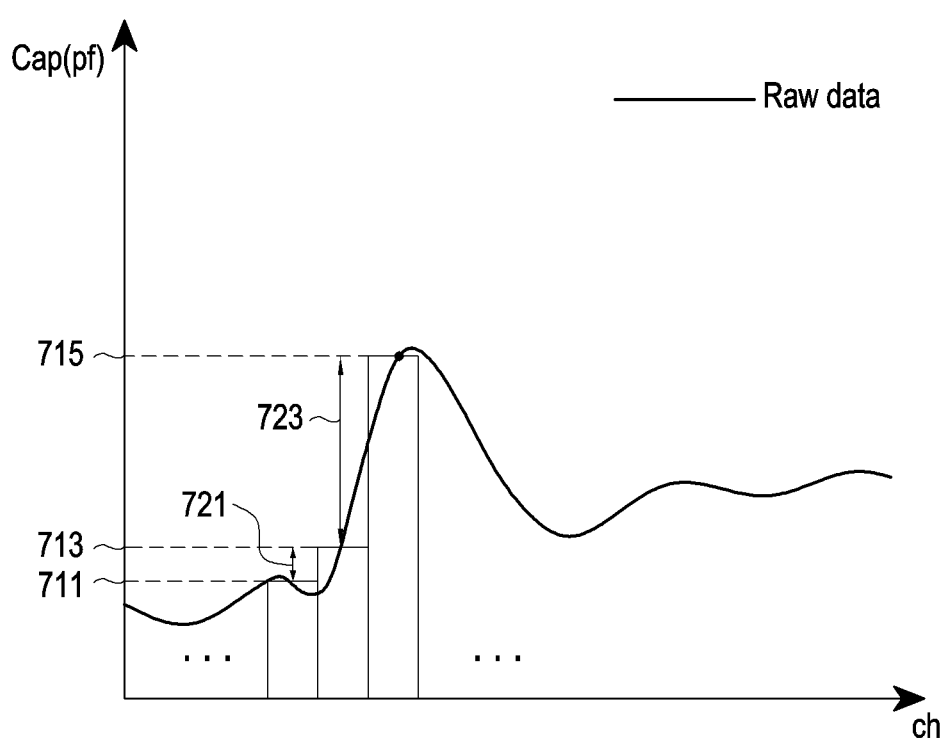
FIG. 7A is graphs illustrating raw data according to an embodiment.
Figure 7B:
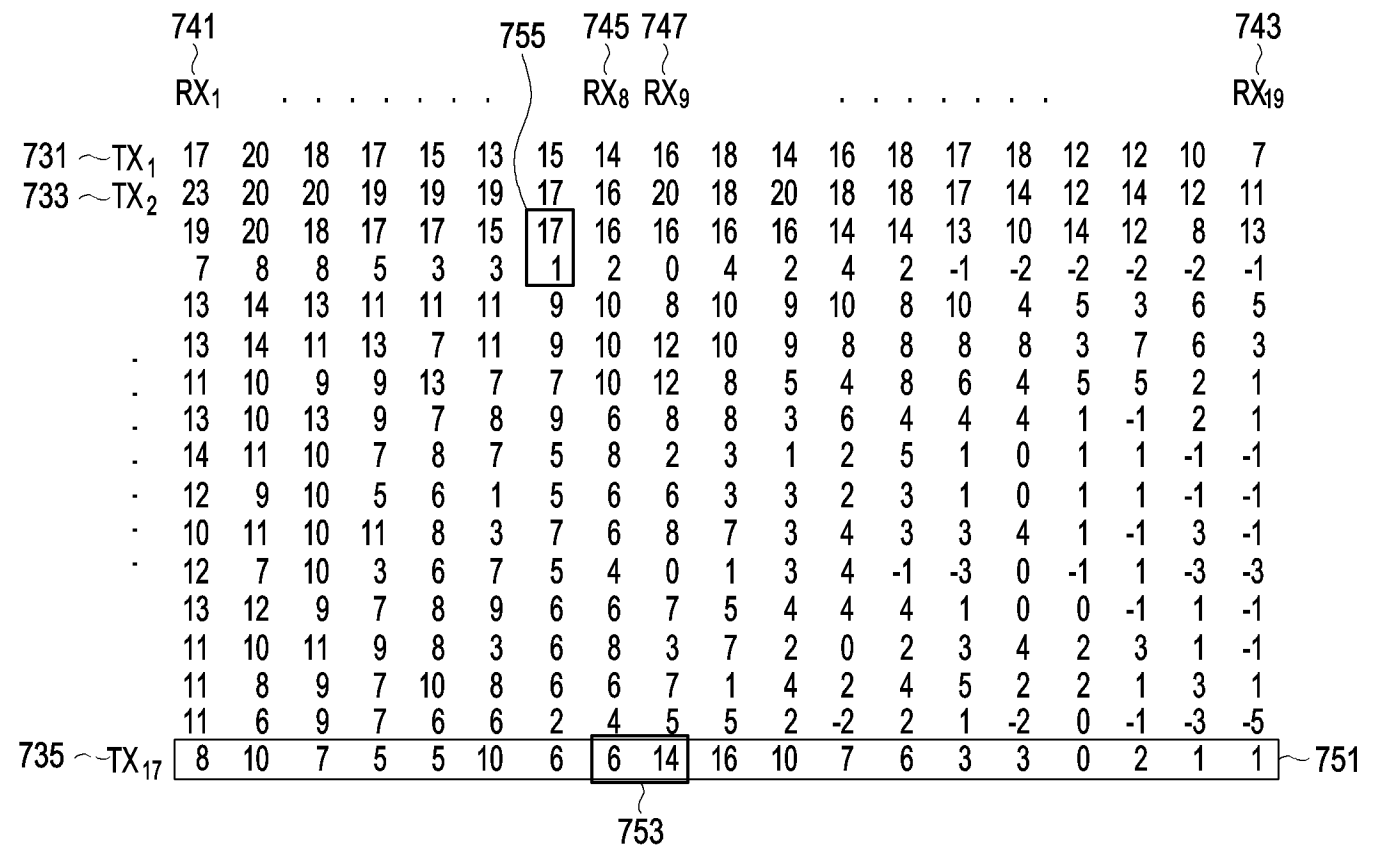

FIG. 6 is a flowchart illustrating an operation method of an electronic device according to an embodiment. The embodiment related to FIG. 6 is described in greater detail with reference to FIGS. 7A and 7B. FIG. 7A is a graph illustrating raw data according to an embodiment. FIG. 7B is a view illustrating raw data according to an embodiment.

Referring to FIG. 6, in operations 601, the electronic device 101 (e.g., the touch circuit 250) may obtain values associated with a plurality of per-channel capacitances. For example, the values associated with the plurality of per-channel capacitances may be raw data selected as a baseline. In an embodiment, the values associated with the plurality of per-channel capacitances may represent digital values into which analog signals respectively output from the plurality of channels have been converted, or values associated with the magnitude of the plurality of per-channel capacitances identified based on the signals respectively output from the plurality of channels. In the instant disclosure, the value associated with the capacitance for each channel may be implemented as a value used to detect whether there is a touch for each channel, e.g., the strength of the signal output from each channel, the capacitance for each channel, or a value that may be mapped to the capacitance for each channel, but is not limited thereto.

Specifically, a plurality of transmission channels and a plurality of reception channels included in the touch circuit 250 may be disposed to be orthogonal to each other. In this case, the electronic device 101 may generate raw data (e.g., raw data including capacitances formed between the channels) based on signals output from the plurality of transmission channels and the plurality of reception channels.

In operation 603, the electronic device 101 (e.g., the touch circuit 250) may identify a difference between values associated with two adjacent channels among the plurality of channels. For example, as illustrated in FIG. 7A, the values associated with the plurality of per-channel capacitances may be shown according to the order in which the plurality of channels are arranged. In this case, the electronic device 101 may identify the difference 721 between the value 711 associated with the first channel and the value 713 associated with the second channel and/or the difference 723 between the value 713 associated with the second channel and the value 715 associated with the third channel. These differences may be determined as the difference between the values associated with two channels. In operation 603, only the first to third channels have been described as an example, but the electronic device 101 may identify all the difference values between any two adjacent channels among the plurality of channels.

According to an embodiment, the electronic device 101 may identify the difference between the values of adjacent channels based on values associated with the capacitances obtained from a plurality of reception channels for one transmission channel. For example, as illustrated in FIG. 7B, the touch circuit 250 may include first transmission channel (Tx1) 731 to seventeenth transmission channel (Tx17) 735, and first reception channel (Rx1) 741 to nineteenth reception channel (Rx19) 743. In this case, the touch circuit 250 may supply power to the first transmission channel 731, and obtain capacitance-associated values from the first reception channel 741 to the nineteenth reception channel 743. Further, the touch circuit 250 may then supply power to the second transmission channel 733, and obtain capacitance-associated values from the first reception channel 741 to the nineteenth reception channel 743. It is possible to obtain values associated with the plurality of per-channel capacitances, as illustrated in FIG. 7B, by sequentially supplying power to each transmission channel (third transmission channel to seventeenth transmission channel 735) and repeating the process of obtaining the capacitance-associated values through the first reception channel 741 to the nineteenth reception channel 743. If driving is performed per transmission channel as such, it is possible to simultaneously obtain capacitance-associated values for the plurality of reception channels while providing power to the transmission channels sequentially (i.e., at different times). In this case, similar levels of noise may exist the capacitance-associated values of the plurality of reception channels after suppling power to one transmission channel. By using this technique, it is possible to identify the difference between the values associated with two adjacent channels among the values obtained from the plurality of reception channels for each transmission channel. For example, the capacitance-associated values 751 obtained through the first reception channel 741 to the nineteenth reception channel 743 after supplying power to the seventeenth transmission channel 735 may be (8, 10, 7, 5, 5, 10, 6, 6, 14, 16, 10, 7, 6, 3, 3, 0, 2, 1, 1). The electronic device 101 may identify the difference between the values associated with two adjacent channels by identifying the difference between two adjacent values among the obtained values 751. Meanwhile, when driving each transmission channel sequentially, since there is a time difference in supply of power to each of the transmission channels, the value (e.g., 755) associated with two adjacent transmission channels may not be considered.

Referring back to FIG. 6, in operation 605, the electronic device 101 (e.g., the touch circuit 250) may identify whether the identified difference between the values exceeds a threshold. Referring to FIG. 7B, as an example, the electronic device 101 may identify that the difference between the values associated with the eighth reception channel 745 and the ninth reception channel 747 adjacent to each other in the values associated with the capacitances between the seventeenth transmission channel 735 and the plurality of reception channels exceeds the threshold. The values associated with the plurality of per-channel capacitances may be rendered to be different by noise (e.g., display, charger, or RF noise), and such a difference due to noise may be smaller than noise caused to touches. Accordingly, the threshold may be set to a value greater than the difference caused by the display, charger, or RF noise.

Referring back to FIG. 6, if the identified difference between the values does not exceed the threshold, the electronic device 101 (e.g., the touch circuit 250) may generate signal data based on the generated baseline in operation 607. The electronic device 101 may generate raw data and may generate signal data according to a difference between the generated raw data and the baseline. When the identified difference between the values does not exceed the threshold, it may mean that the previous raw data was generated using values obtained in a non-touch state. Accordingly, the electronic device 101 may generate signal data based on the baseline generated based on the previous raw data. Meanwhile, if the values identified as exceeding the threshold correspond to a specific area, such as an edge or a hole, of the display, operation 607 may be followed even when the threshold is exceeded.

When the identified difference between the values exceeds the threshold, the electronic device 101 (e.g., the touch circuit 250) may reset the generated baseline in operation 609. When the identified difference between the values exceeds the threshold, it may mean that the previous raw data was generated using values obtained while the touch is maintained. For example, when the screen of the display (e.g., the display 210) is touched by the user' hand when it is in the on mode, and is switched into the off mode while the touch is maintained, raw data first generated after the display screen is switched into the off mode may be values obtained while the touch is maintained. Or, when the identified difference between the values exceeds the threshold, it may mean that the previous raw data is generated using values obtained in a state in which a charger is connected, a state in which RF noise is present, a state in which an external object is in proximity, or a state in which grip by the user is maintained. Since the baseline generated based on the raw data includes noise, the electronic device 101 may reset the generated baseline. For example, the electronic device 101 may generate new raw data and reset the baseline based on the new raw data.

In operation 611, the electronic device 101 (e.g., the touch circuit 250) may generate signal data based on the reset baseline. The electronic device 101 may generate raw data and may generate signal data according to a difference between the generated raw data and the reset baseline.

Figure 8:
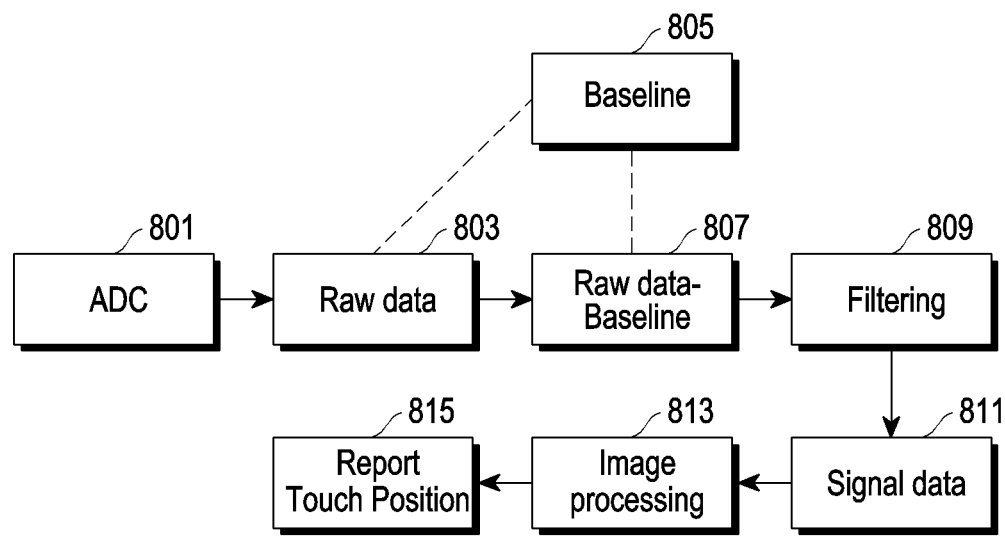
FIG. 8 is a view illustrating an operation method of an electronic device according to an embodiment.
Figure 9A:
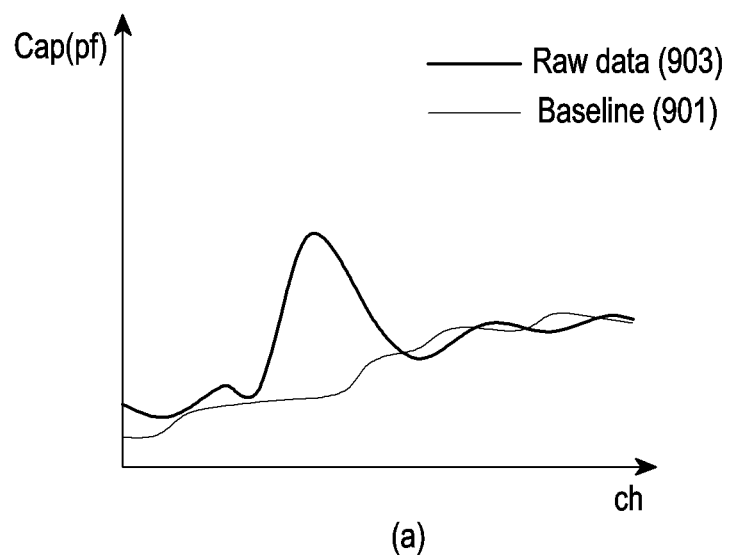
FIG. 9A is graphs illustrating signal data according to an embodiment.
Figure 9A:
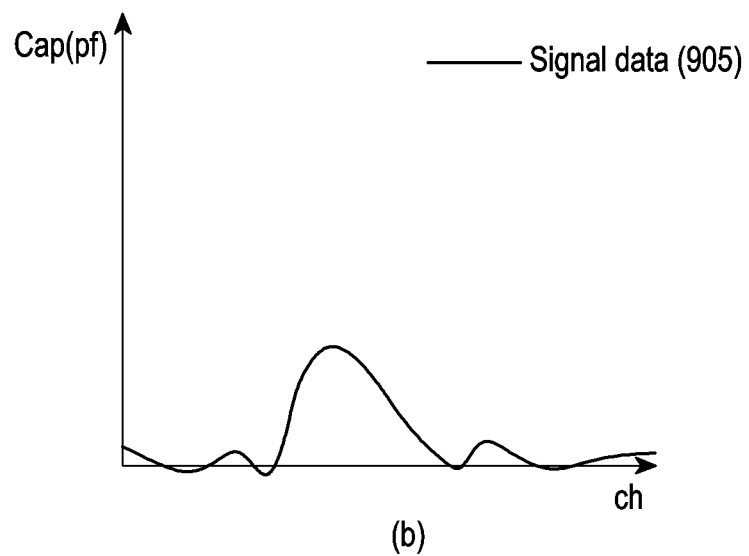
Figure 9B:
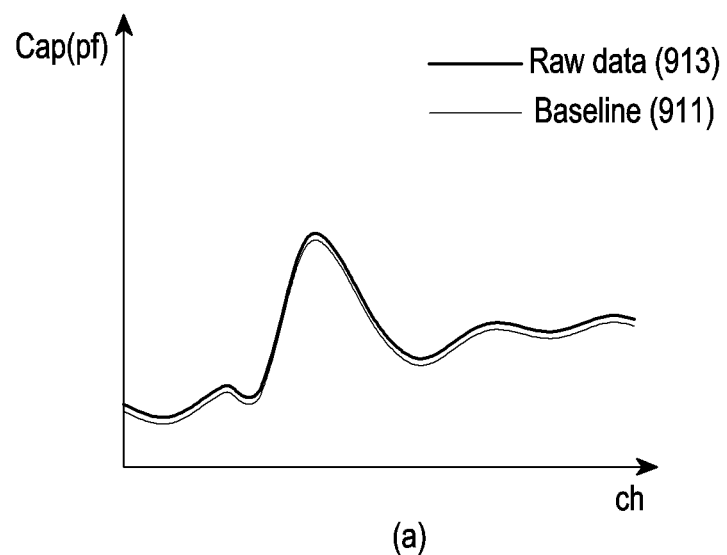
FIG. 9B is graphs illustrating signal data according to another embodiment.
Figure 9B:
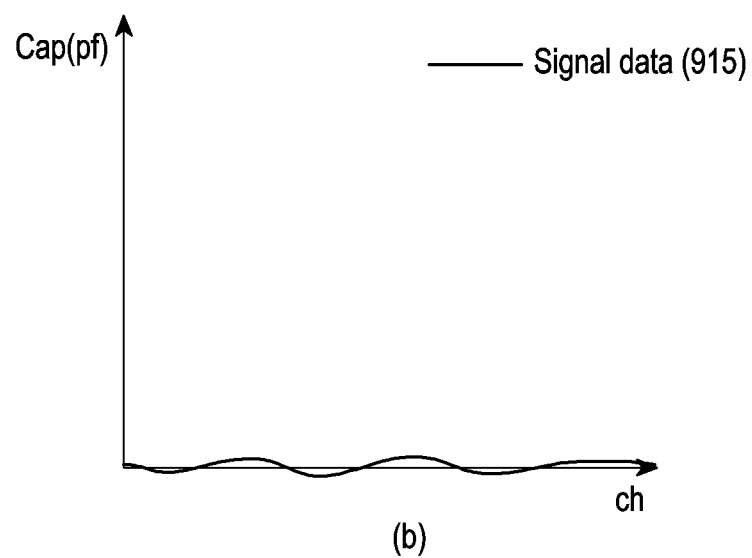

FIG. 8 is a flowchart illustrating an operation method of an electronic device according to an embodiment. The embodiment related to FIG. 8 is described in greater detail with reference to FIGS. 9A and 9B. FIG. 9A is graphs illustrating signal data according to an embodiment. FIG. 9B is graphs illustrating signal data according to another embodiment.

The operations of FIG. 8 may be operations performed by the electronic device 101 (e.g., the touch circuit 250). At least some of the various operations of FIG. 8 may be at least simultaneously performed. Further, another operation not shown in FIG. 8 may intervene between two adjacent operations of FIG. 8. Alternatively, at least one of the operations of FIG. 8 may not be performed.

According to an embodiment, the electronic device 101 may convert (801) an analog signal sensed by the touch sensor 251 into a digital signal. For example, the touch sensor 251 may sense the capacitances formed by the plurality of channels of the touch circuit 250, and at least some of the capacitances formed by the plurality of channels may be changed by a touch.

The electronic device 101 may generate (803) raw data using various techniques such as calibration or offset removal, on the digital signal data.

The electronic device 101 may generate (805) a baseline based on the raw data. Generating the baseline based on the raw data may mean setting specific raw data among the generated raw data as the baseline. For example, the electronic device 101 may set raw data first generated after the mode of the display (e.g., the display 210) is switched, as the baseline.

The electronic device 101 may calculate (807) data obtained by removing the baseline from the raw data. In this case, the raw data may be new raw data generated after the first set of raw data was used as the baseline. The calculated data may reflect how the raw data has changed.

The electronic device 101 may generate (811) signal data by filtering (809) the calculated data. For example, as illustrated in (a) of FIG. 9A, a baseline 901 may be set, and raw data 903 may be generated. The signal data 905 of (b) of FIG. 9A may represent signal data generated by filtering data obtained by removing the baseline 901 from the raw data 903. As another example, as illustrated in (a) of FIG. 9B, a baseline 911 may be set, and raw data 913 may be generated. The raw data 913 may indicate a state in which the user's touch is input. The signal data 915 of (b) of FIG. 9B may represent signal data generated by filtering data obtained by removing the baseline 911 from the raw data 913. In this case, although the user's touch is input, the electronic device 101 cannot identify the user's touch by processing the signal data 915.

The electronic device 101 may perform image processing (813) on the signal data and report (815) information regarding the position where the touch is input to the processor (e.g., the processor 120).

Figure 10A:
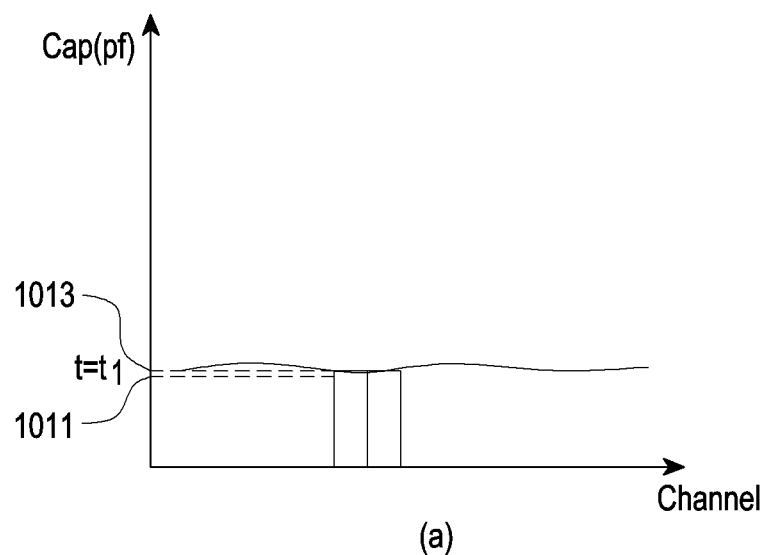
FIG. 10A is graphs illustrating signal data according to an embodiment.
Figure 10A:
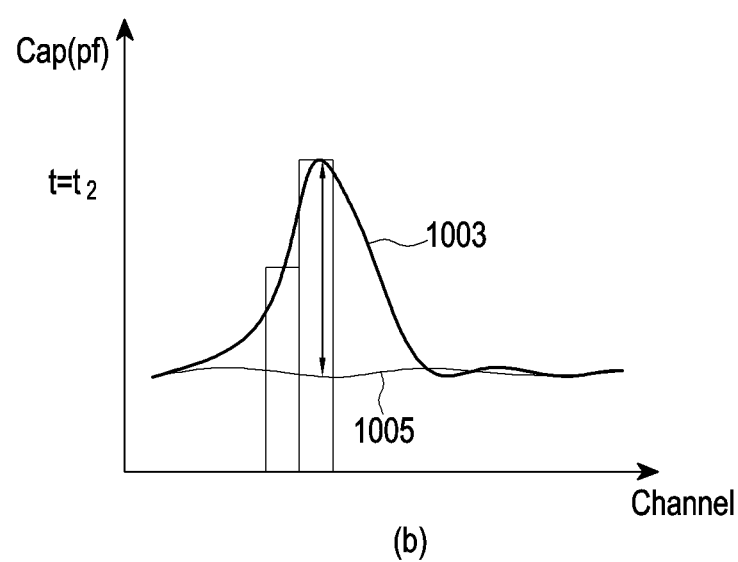

FIG. 10A is graphs illustrating signal data according to an embodiment.

Referring to FIG. 10A, the raw data 1001 of (a) of FIG. 10A is first raw data generated at time t1. It may be identified that a difference between the data 1011 and 1013 respectively corresponding to the adjacent channels among the first raw data is less than or equal to a threshold. Although only data corresponding to two adjacent channels is shown, differences between data respectively corresponding to adjacent channels among the first raw data may all be less than or equal to the threshold. The electronic device 101 (e.g., the touch circuit 250) may generate a first baseline using the first raw data 1001.

The raw data 1003 of (b) of FIG. 10A is the second raw data 1003 generated at time t2. Based on the difference between the data 1011 and 1013 respectively corresponding to the adjacent channels among the first raw data 1001 being less than or equal to the threshold, the electronic device 101 may generate signal data by removing the first baseline 1005 from the second raw data 1003. The electronic device 101 may provide information regarding the position where the touch is input based on the generated signal data to the processor (e.g., the processor 120).

Figure 10B:
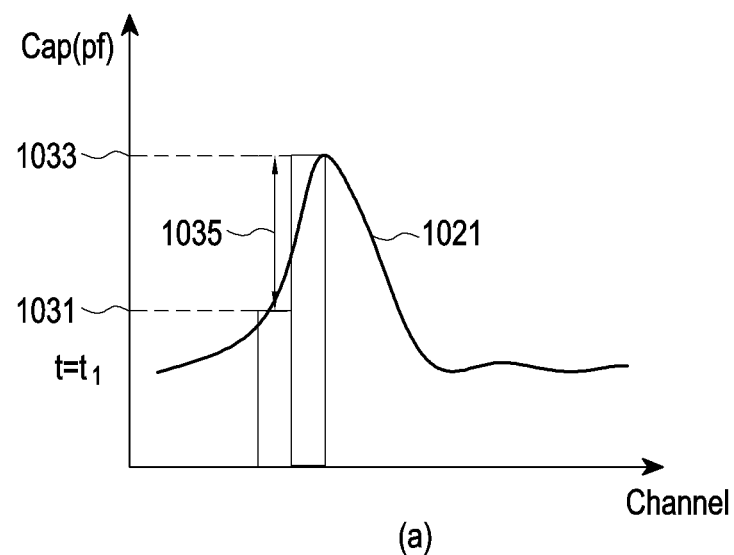
FIG. 10B is graphs illustrating signal data according to an embodiment.
Figure 10B:
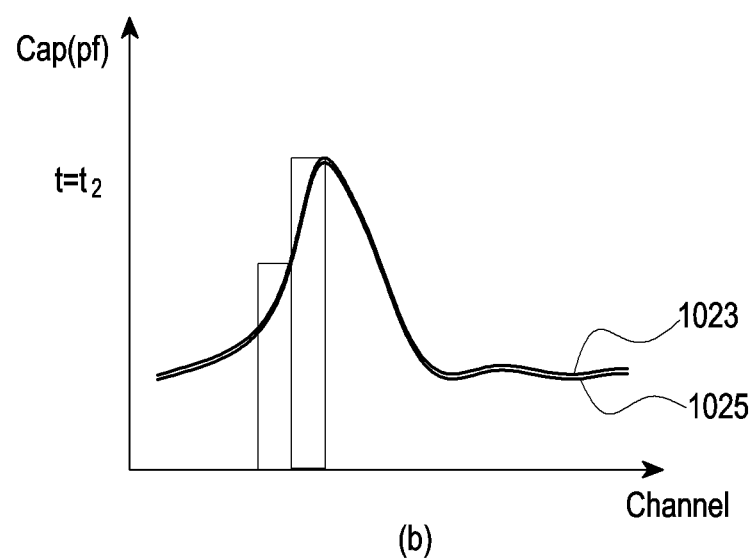

FIG. 10B is graphs illustrating signal data according to an embodiment.

Referring to FIG. 10B, the raw data 1021 of (a) of FIG. 10B is first raw data generated at time t1. It may be identified that a difference 1035 between the data 1031 and 1033 respectively corresponding to the adjacent channels among the first raw data exceeds a threshold. The electronic device 101 (e.g., the touch circuit 250) may generate a first baseline using the first raw data 1021.

The raw data 1023 of (b) of FIG. 10B is the second raw data 1023 generated at time t2. Based on the difference between the data 1031 and 1033 respectively corresponding to the adjacent channels among the first raw data 1021 exceeding the threshold, the electronic device 101 may discard the signal data by removing the first baseline 1025 from the second raw data 1023. Disregarding the signal data may mean that the touch circuit 250 does not perform the operation of providing the processor with information regarding the position where the touch is input based on the signal data.

As described with reference to FIGS. 10A and 10B, the method of processing the signal data generated based on the baseline may differ depending on whether the difference between data respectively corresponding to the adjacent channels among the raw data set as the baseline exceeds the threshold.

Figure 11:
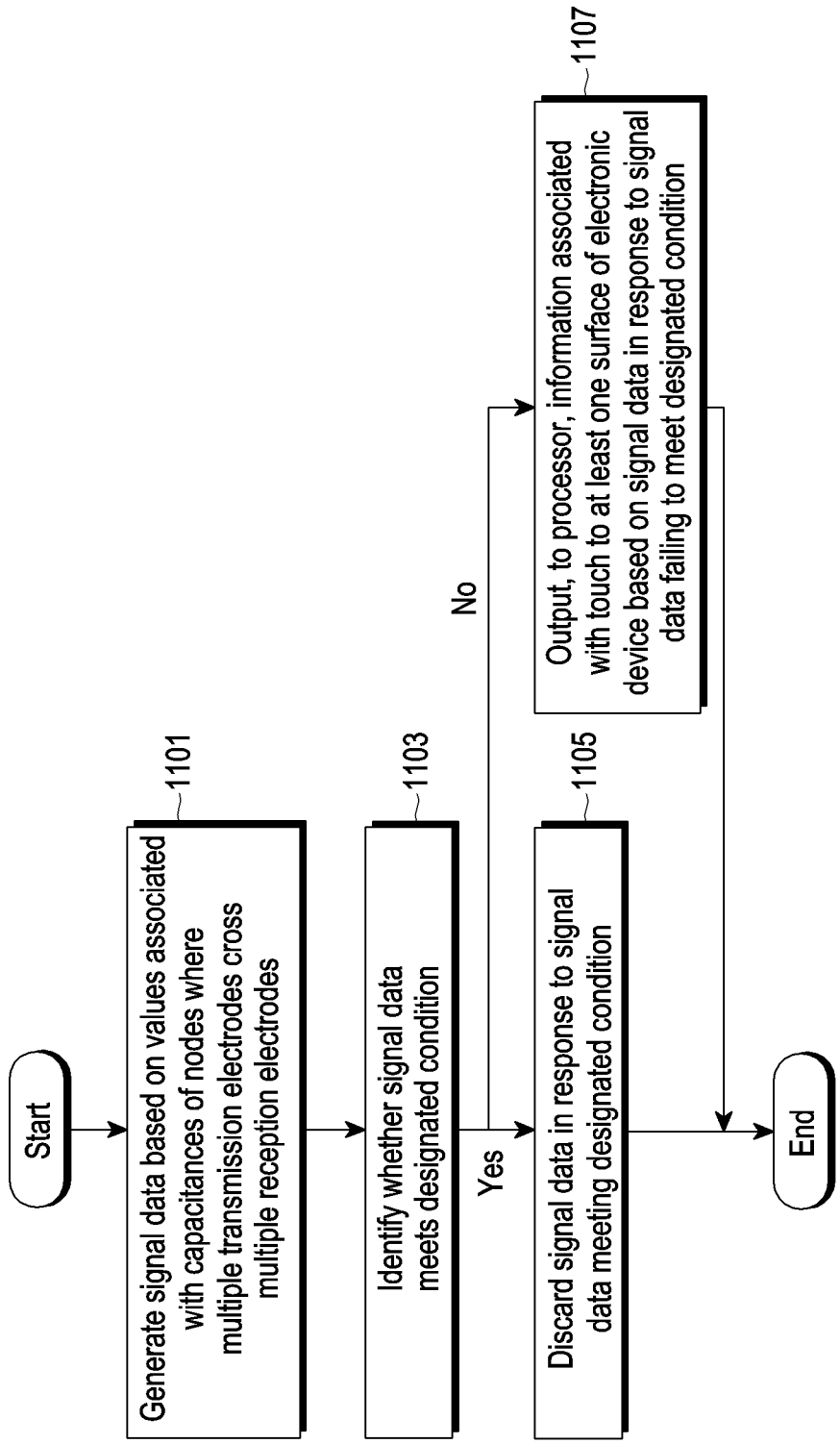
FIG. 11 is a flowchart illustrating an operation method of an electronic device according to an embodiment.

FIG. 11 is a flowchart illustrating an operation method of an electronic device according to an embodiment. When the electronic device 101 performs a specific operation, it may mean that a hardware device (e.g., the touch circuit 250) in the electronic device 101 performs the specific operation. In this case, the hardware device (e.g., the touch circuit 250) by itself may perform the specific operation by a control circuit (e.g., the touch sensor IC 253) in the hardware device. Alternatively, when the electronic device 101 performs a specific operation, it may mean that the processor 120 performs the specific operation or a hardware device (e.g., the touch sensor IC 253, the display driver IC 230, or the display 210) performs the specific operation based on the control of the processor 120. Alternatively, when the electronic device 101 performs a specific operation, it may mean that an instruction to enable the processor 120 or a hardware device other than the processor 120 to perform the specific operation is executed. In this case, performing a specific operation may mean that an instruction to enable the specific operation to be performed is stored in the memory 130.

Referring to FIG. 11, in operation 1101, the electronic device 101 (e.g., the touch circuit 250) may generate signal data based on values associated with the capacitances of nodes where a plurality of transmission electrodes and a plurality of reception electrodes cross each other. For example, the electronic device 101 may include a plurality of transmission channels and a plurality of reception channels that cross each other. In this case, the electronic device 101 may receive an electrical signal from each of the reception channels, and based thereupon, identify the capacitance formed between the transmission channel and the reception channel. The capacitance formed between the transmission channel and the reception channel may be represented as a capacitance for a node, and the value associated with the capacitance may be raw data. The electronic device 101 may generate signal data according to a difference between raw data and a baseline. For example, the signal data may be raw data minus the baseline.

In operation 1103, the electronic device 101 (e.g., the touch circuit 250) may identify whether the signal data meets a designated condition. The designated condition may include a condition in which an input detected based on the signal data is identified as not being the user's touch input. For example, if at least part of the signal data is a value smaller than a negative first threshold, the electronic device 101 may identify that the designated condition is met. In another example, a number of nodes whose capacitance values may exceed a second threshold. If the number of nodes exceeds a third threshold, the electronic device 101 may identify that the designated condition is met. In yet another example, if the electronic device 101 continuously fails to identify an operation corresponding to an input detected based on signal data, and the number of continuous failures is equal to or greater than a set number, the electronic device 101 may identify that the designated condition is met.

In operation 1105, the electronic device 101 (e.g., the touch circuit 250) may discard the signal data in response to the signal data meeting the designated condition. Disregarding the signal data may mean refraining from transmitting touch-associated information identified based on the signal data to the processor. Or, discarding the signal data may mean refraining from performing the operation corresponding to touch-associated information identified based on the signal data.

In operation 1107, the electronic device 101 (e.g., the touch circuit 250) may output, to the processor, information associated with a touch to at least one surface of the electronic device based on the signal data, in response to the signal data failing to meet the designated condition. For example, the electronic device 101 may image-process the signal data and notify the processor of information regarding the position where the touch is input.

Figure 12:
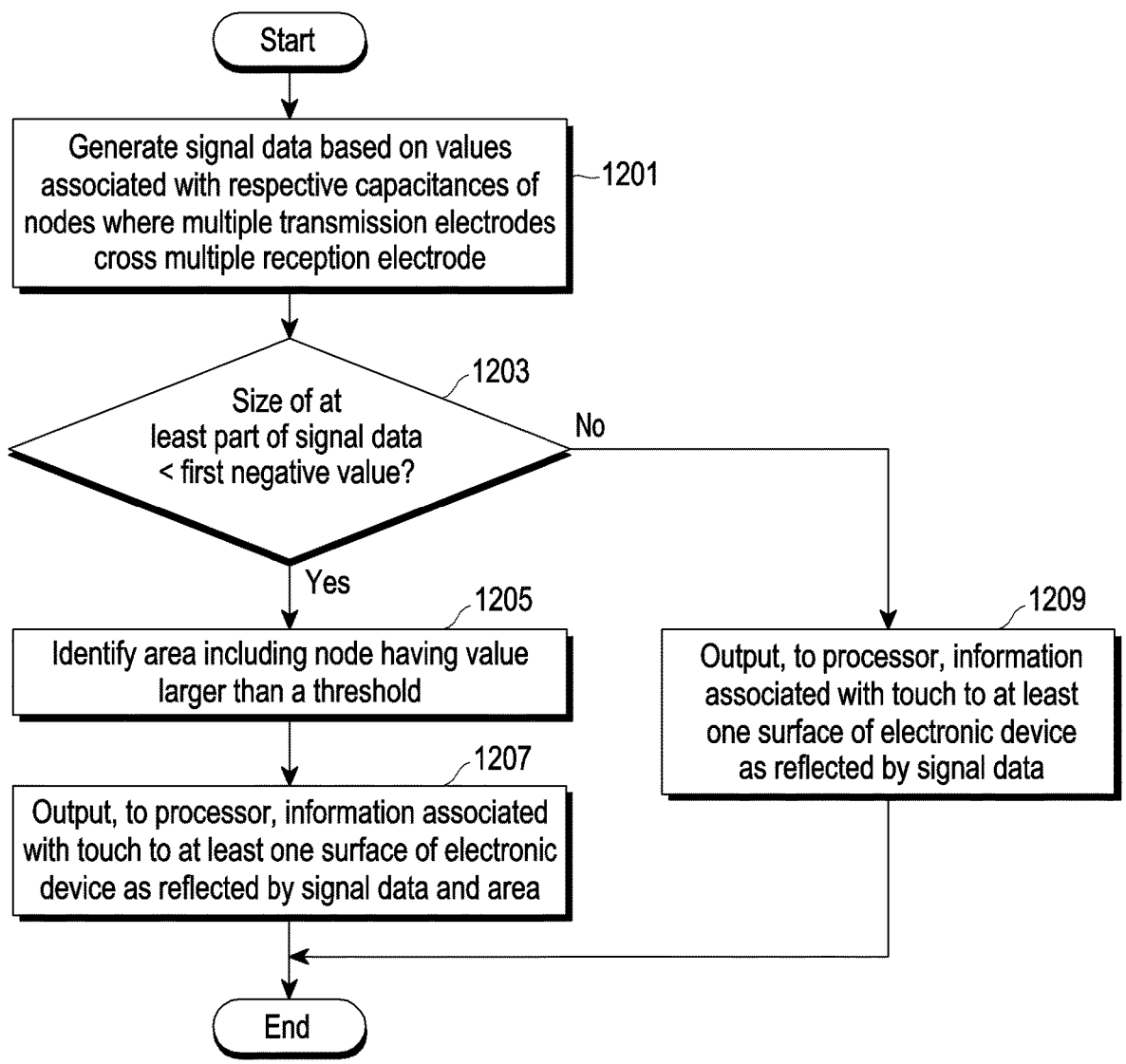
FIG. 12 is a flowchart illustrating an operation method of an electronic device according to an embodiment.

FIG. 12 is a flowchart illustrating an operation method of an electronic device according to an embodiment. The embodiment of FIG. 12 is described in more detail with reference to FIGS. 13A, 13B, 13C, and 13D. FIGS. 13A to 13D are views or graphs illustrating signal data according to an embodiment.

Figure 13A:
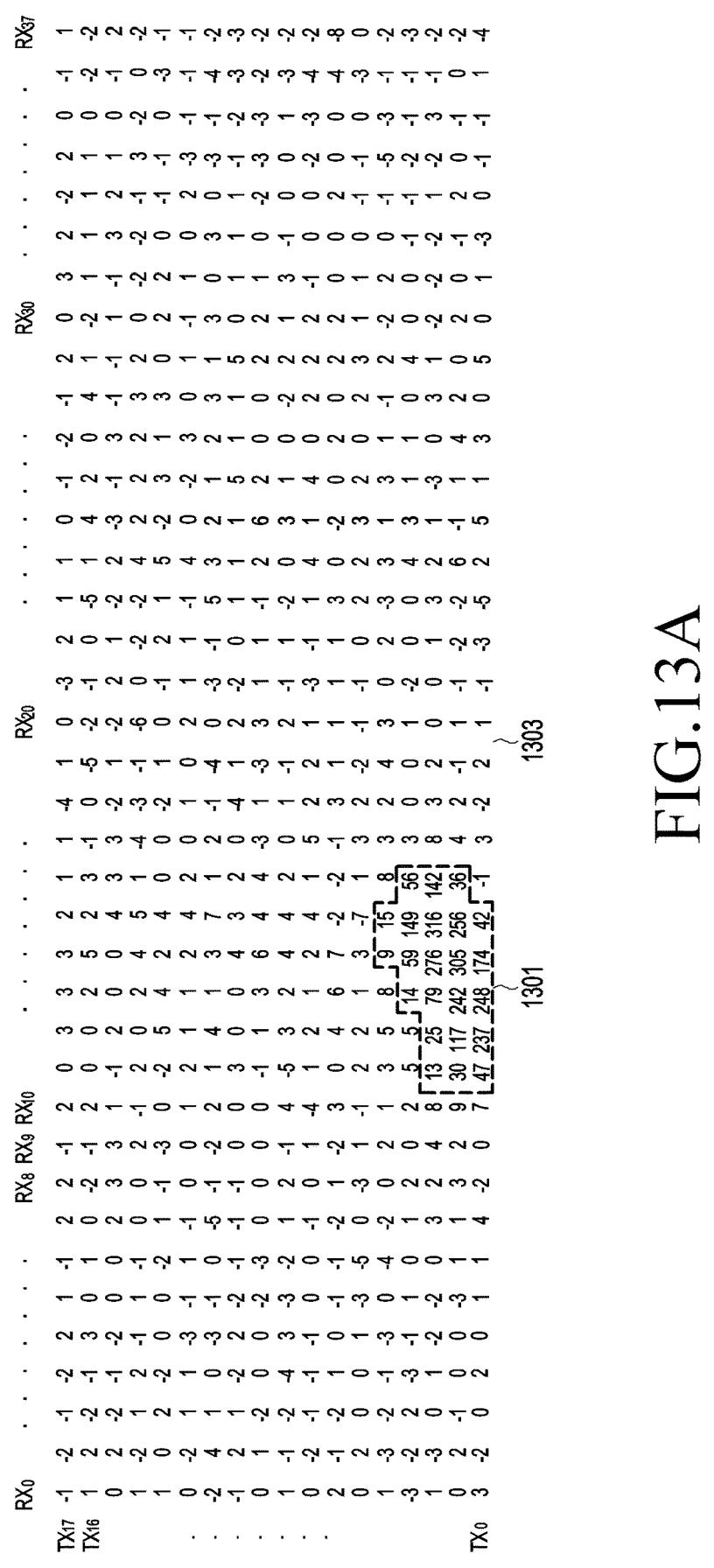

Referring to FIG. 12, in operation 1201, the electronic device 101 (e.g., the touch circuit 250) may generate signal data based on values associated with the capacitances of nodes where a plurality of transmission electrodes and a plurality of reception electrodes cross each other. The electronic device 101 may generate the difference between the values associated with the per-node capacitances and the baseline, as signal data. For example, in a state (e.g., gripped state) in which at least one surface of the electronic device is touched by the user's hand, the portion touched by the user's hand may be increased in capacitance by the user's hand. If a normal baseline is set, the electronic device 101 may generate signal data in which the data of the area 1301 touched by the user's hand has a value larger than the data of the area 1303 not touched by the user's hand, as illustrated in FIG. 13A.

Meanwhile, if an event occurrence (e.g., on/off of the display screen, connection of a charger, connection of an earjack, or arrival of a set period) is detected while the gripped state is maintained, the electronic device 101 may reset raw data reflecting the gripped state as a baseline. Operation 1203 may be assumed to be performed in a situation in which raw data generated while the user's hand touches is set as the baseline.

Figure 13B:
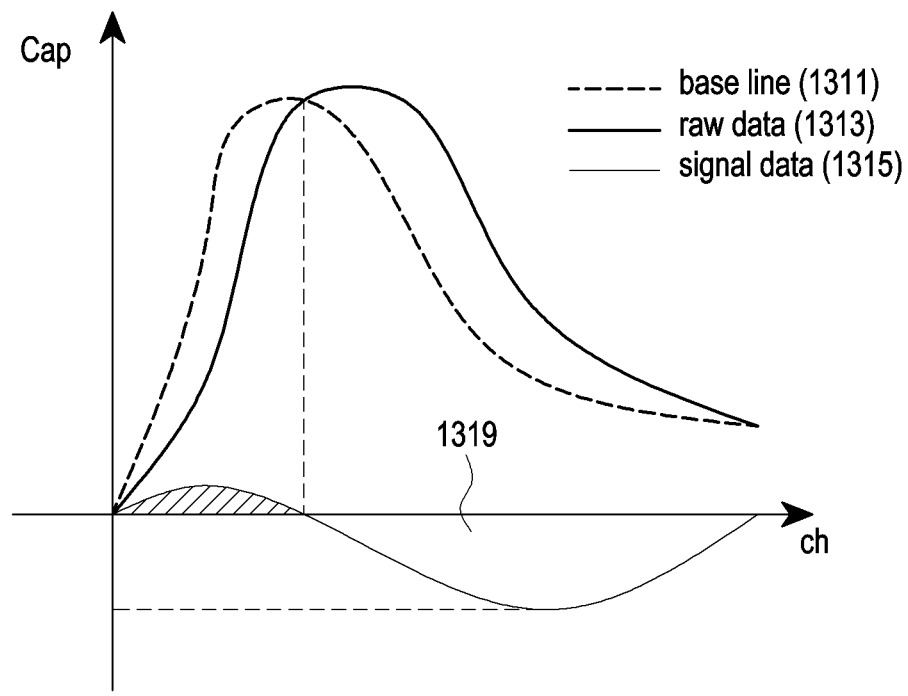
FIG. 13B is a graph illustrating signal data according to an embodiment.
Figure 13C:
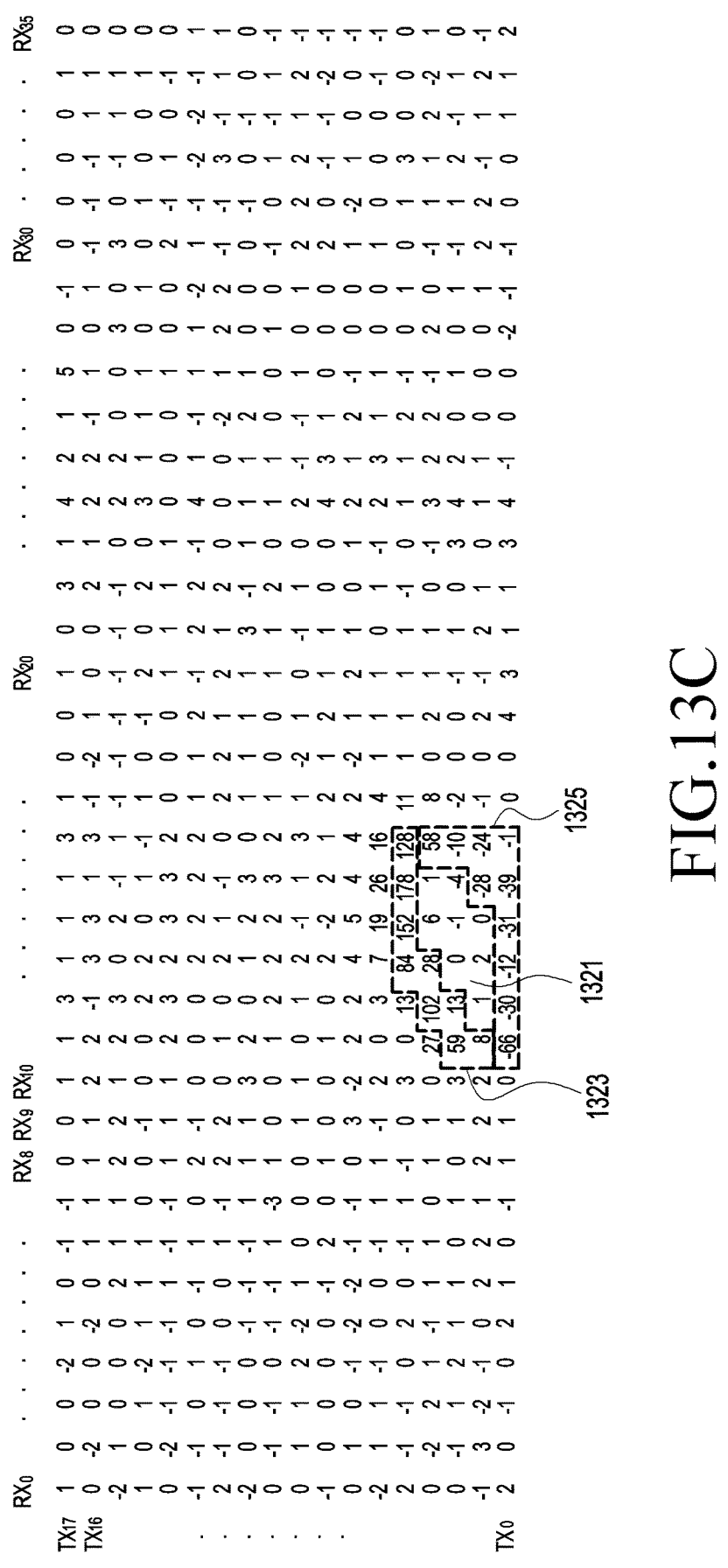
Figure 13D:
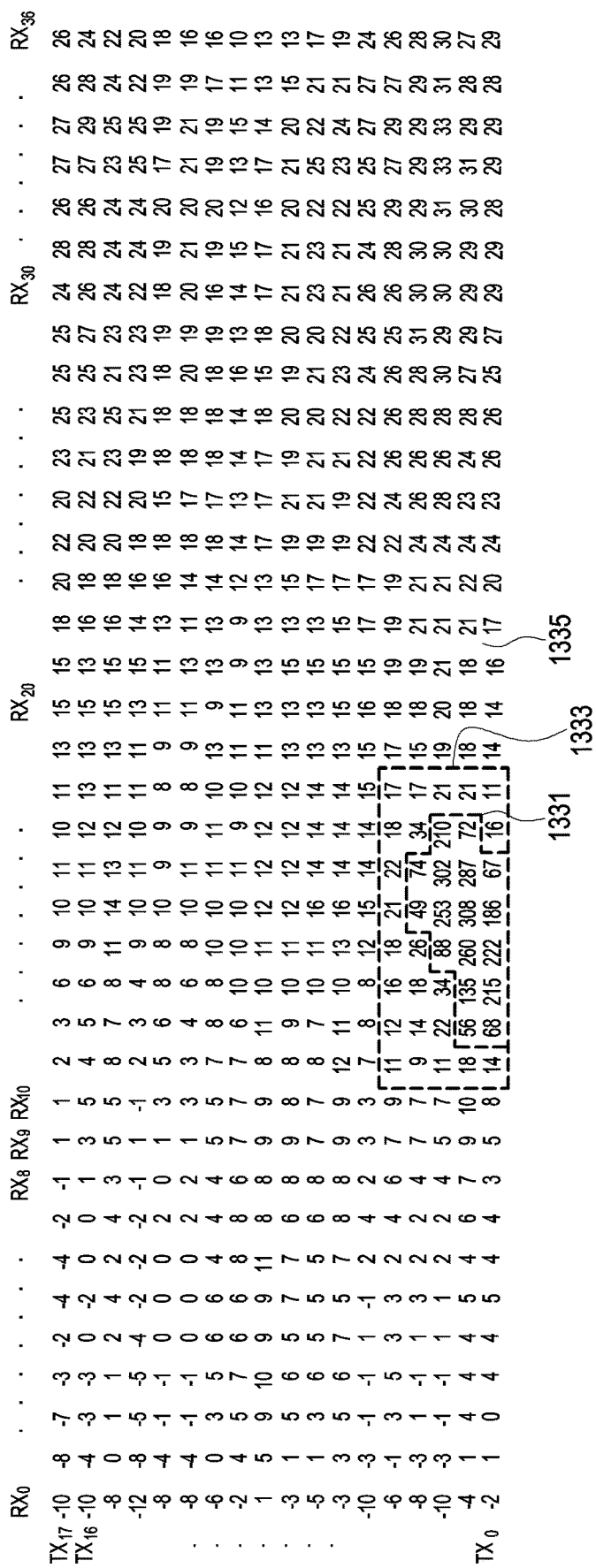
FIG. 13D is a view illustrating signal data according to an embodiment.

In operation 1203, the electronic device 101 (e.g., the touch circuit 250) may identify whether at least a portion of the signal data is smaller than a first negative value. If the user's hand moves while maintaining the touch in the state in which the raw data generated while the user's hand touches is set as the baseline, the signal data value of the area where the hand touch is maintained may be maintained. However, the signal data of the area where there used to be no contact with the user's hand but the user's hand comes in contact may increase, and the signal data of the area where there used to be in contact with the user's hand but the user's hand comes out of contact may reduce. For example, referring to FIG. 13B, the baseline generated while the user's touch is maintained may be denoted with reference numeral 1311. If the user's hand in contact with one surface of the electronic device 101 moves a little, the electronic device 101 may generate raw data as denoted with reference numeral 1313. The electronic device 101 may generate signal data 1315 using the difference between the baseline 1311 and the raw data 1313. Signal data for a plurality of channels may be as illustrated in FIG. 13C. When the user's hand moves when the raw data generated while being touched by the user's hand set as the baseline, the electronic device 101 may generate signal data as illustrated in FIG. 13C. For example, the signal data value of the area 1321 in which the user's hand touch is maintained may be maintained. As shown, the signal data value may be determined as maintained when there are changes in signal within an error range. The signal data of the area 1323 where there used to be no contact with the user's hand but the user's hand comes in contact may increase, and the signal data of the area 1325 where there used to be in contact with the user's hand but the user's hand comes out of contact may reduce. The area 1325 where there used to be no contact with the user's hand but the user's hand comes in contact may correspond to the area 1319 in FIG. 13B where the signal data has a negative value. In other words, if the baseline is generated in a state of being touched by the user's hand (gripped state), the electronic device 101 may generate data having a negative value due to the shaking of the user's hand. Since data having a negative value within an error range may be generated even when the baseline is normally set, the electronic device 101 may determine whether at least a portion of the signal data is smaller than the first negative value. If at least a portion of the data is smaller than the first negative value, the electronic device 101 (e.g., the touch circuit 250) may identify an area including a node having a value larger than a threshold in operation 1205. The area including the node having a value larger than a threshold may be any one of an area 1331 where it is determined that a touch is input, an area 1333 adjacent to the area where it is determined that a touch is input, and an entire area 1335 where a touch may be input as illustrated in FIG. 13D. The area including the node having a value larger than a threshold is not limited thereto, but may vary.

In operation 1207, the electronic device 101 (e.g., the touch circuit 250) may output information associated with a touch to at least one surface of the electronic device to the processor as reflected by the signal data and the area. The electronic device 101 may discard information associated with a touch to the area including a node having a value smaller than the first negative value. The electronic device 101 may output, to the processor, information associated with a touch to an area which is not the area including the node having a smaller value than the first negative value. It is thus possible to prevent a malfunction due to an erroneous touch that is not intended by the user, such as the user's hand shake.

When there is no data smaller than the first negative value among the signal data, the electronic device 101 (e.g., the touch circuit 250) may output, to the processor, information associated with a touch to at least one surface of the electronic device as reflected by the signal data in operation 1209.

Figure 14:
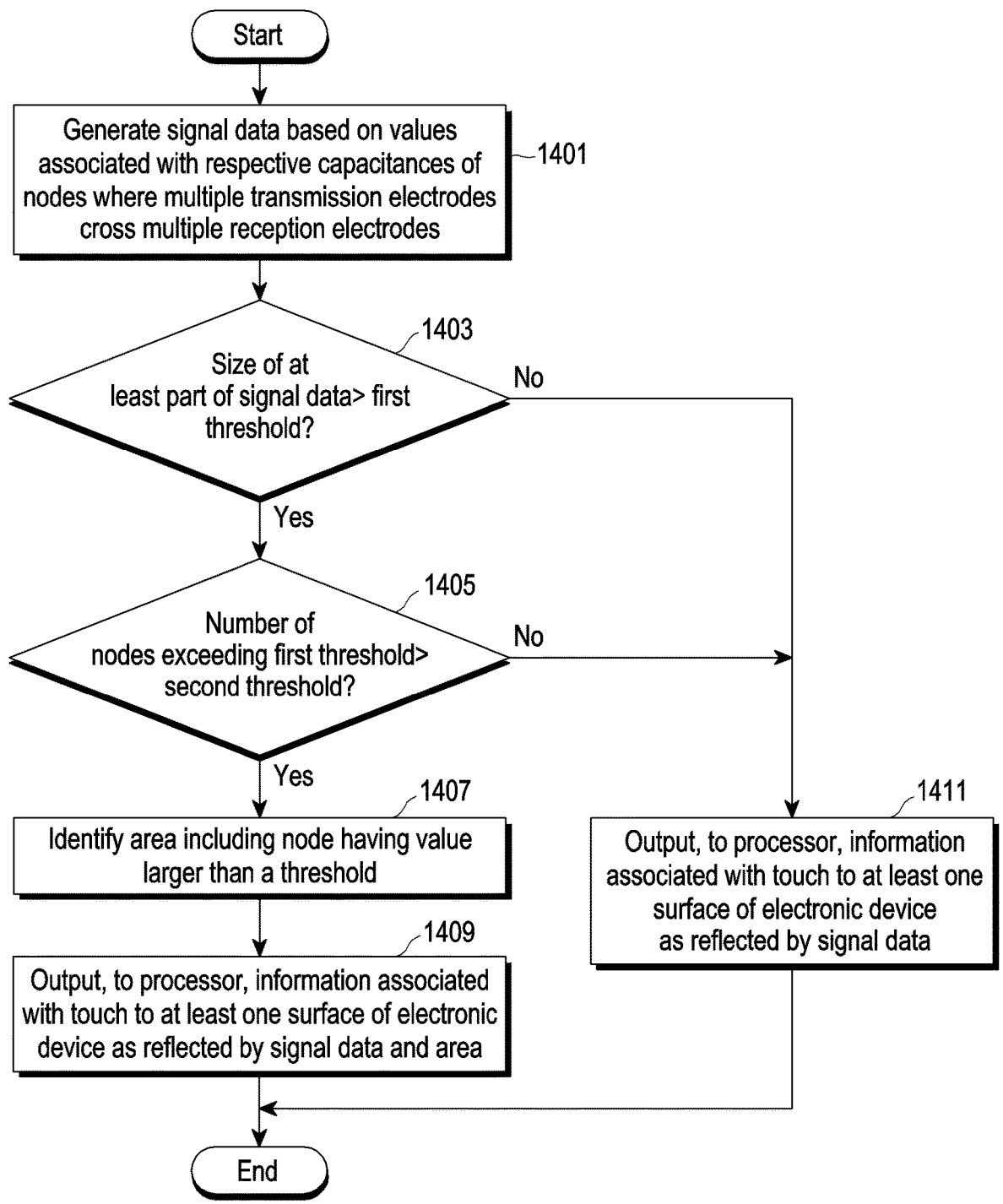
FIG. 14 is a flowchart illustrating an operation method of an electronic device according to an embodiment.

FIG. 14 is a flowchart illustrating an operation method of an electronic device according to an embodiment. The embodiment of FIG. 14 is described in more detail with reference to FIGS. 15A, 15B, 16A, and 16B. FIGS. 15A, 15B, 16A, and 16B are views or graphs illustrating signal data according to certain embodiments.

Referring to FIG. 14, in operation 1401, the electronic device 101 (e.g., the touch circuit 250) may generate signal data based on values associated with the capacitances of nodes where a plurality of transmission electrodes and a plurality of reception electrodes cross each other. The touch circuit 250 may generate the difference between the values associated with the per-node capacitances and the baseline, as signal data. For example, the signal data may include data corresponding to each node.

In operation 1403, the electronic device 101 (e.g., the touch circuit 250) may identify whether the magnitude of at least a portion of the signal data exceeds a first threshold. The first threshold may be set to a value for identifying a noise level (noise floor) that is to be not recognized as touch.

Figure 15A:
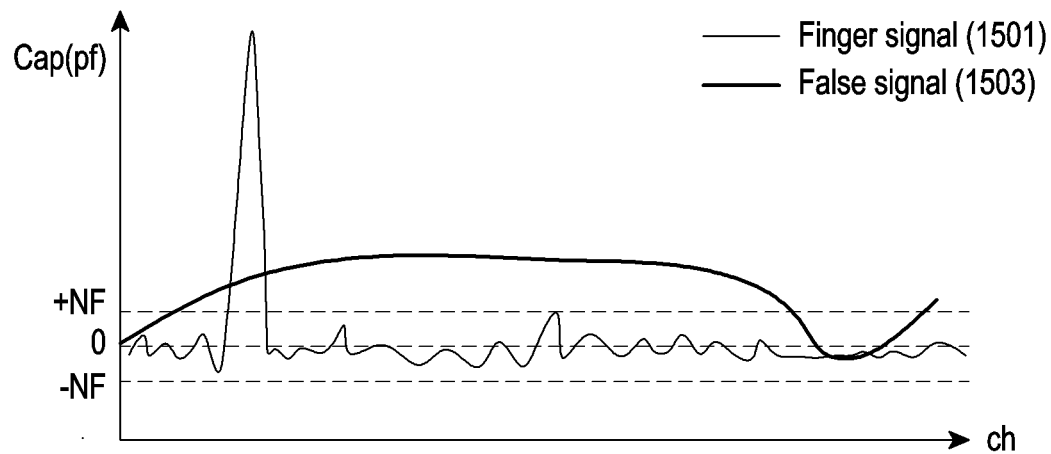
FIG. 15A is a graph illustrating signal data according to an embodiment.
Figure 15B:
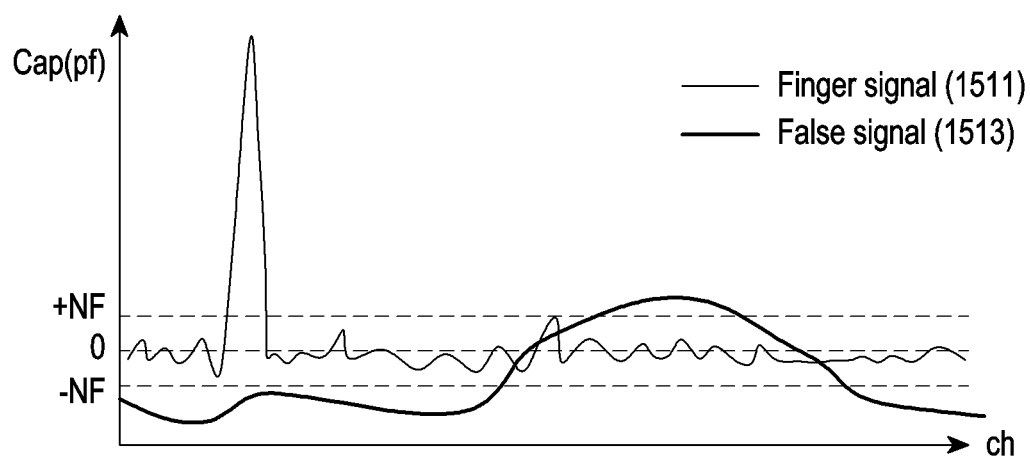
FIG. 15B is a graph illustrating signal data according to an embodiment.

For example, as illustrated in FIG. 15A, the signal data 1501 by a finger may have a high value. The electronic device 101 may determine that a hand touch occurs if the signal data exceeds the noise level 1505 and the third threshold 1507. However, when the electronic device 101 is in contact with the user's body or a magnetic card in the user's pocket, the signal data 1503 by an object in contact with a large area may have a strength that exceeds the noise level but does not exceed the third threshold 1507. Meanwhile, as illustrated in FIG. 15B, the signal data 1511 by a finger may have a high value. However, the signal data 1513 by an object in contact with the electronic device 101 may have a value smaller than the negative noise level, but greater than the negative threshold 1515 identified as a touch. In other words, the electronic device 101 may identify whether at least a portion of the magnitude of the signal data exceeds a first threshold (e.g., a noise level). Since a data signal by an object in contact with an area of the touchscreen may have a positive value or a negative value, the electronic device 101 may determine whether the size (absolute value) of the signal data exceeds the first threshold (e.g., noise level).

In operation 1405, the electronic device 101 (e.g., the touch circuit 250) may identify whether the number of nodes exceeding the first threshold exceeds a second threshold. The second threshold may be set as the number of nodes occupying more than a specific area of the area in which touch recognition of the electronic device 101 is possible.

Figure 16A:
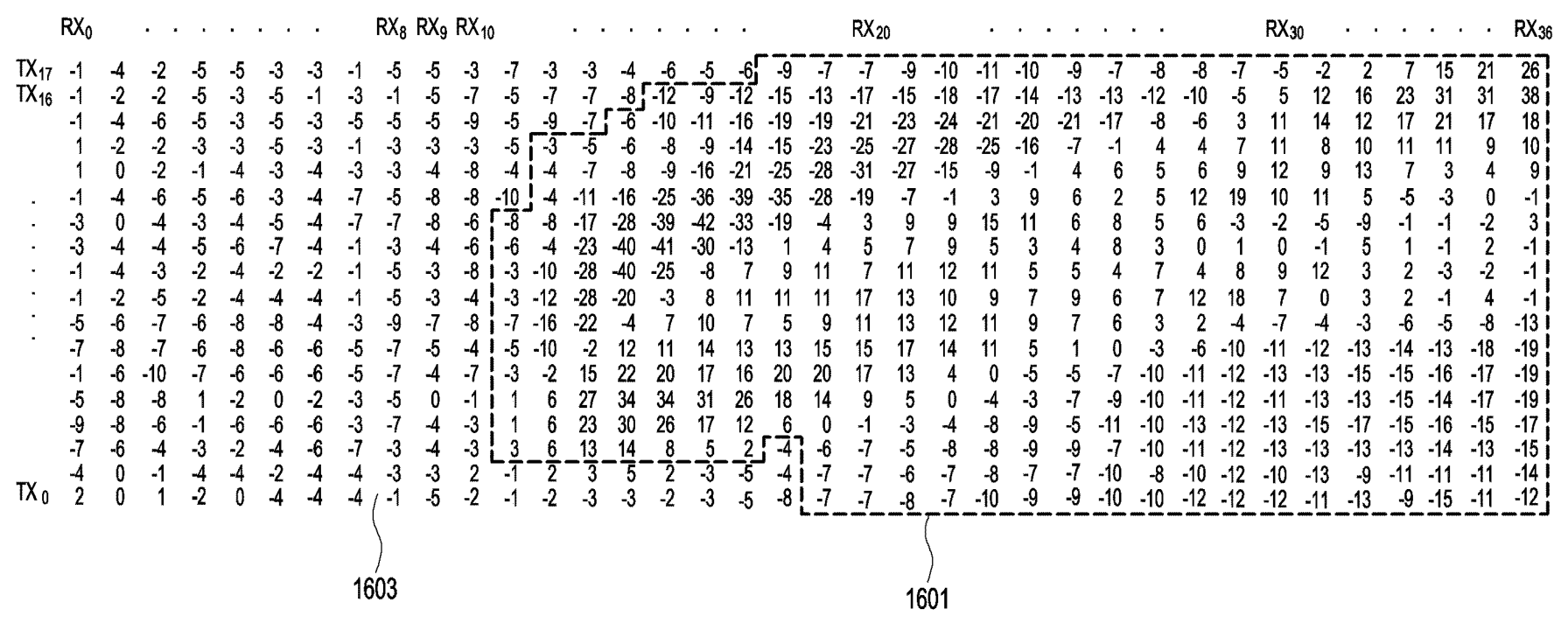
Figure 16B:
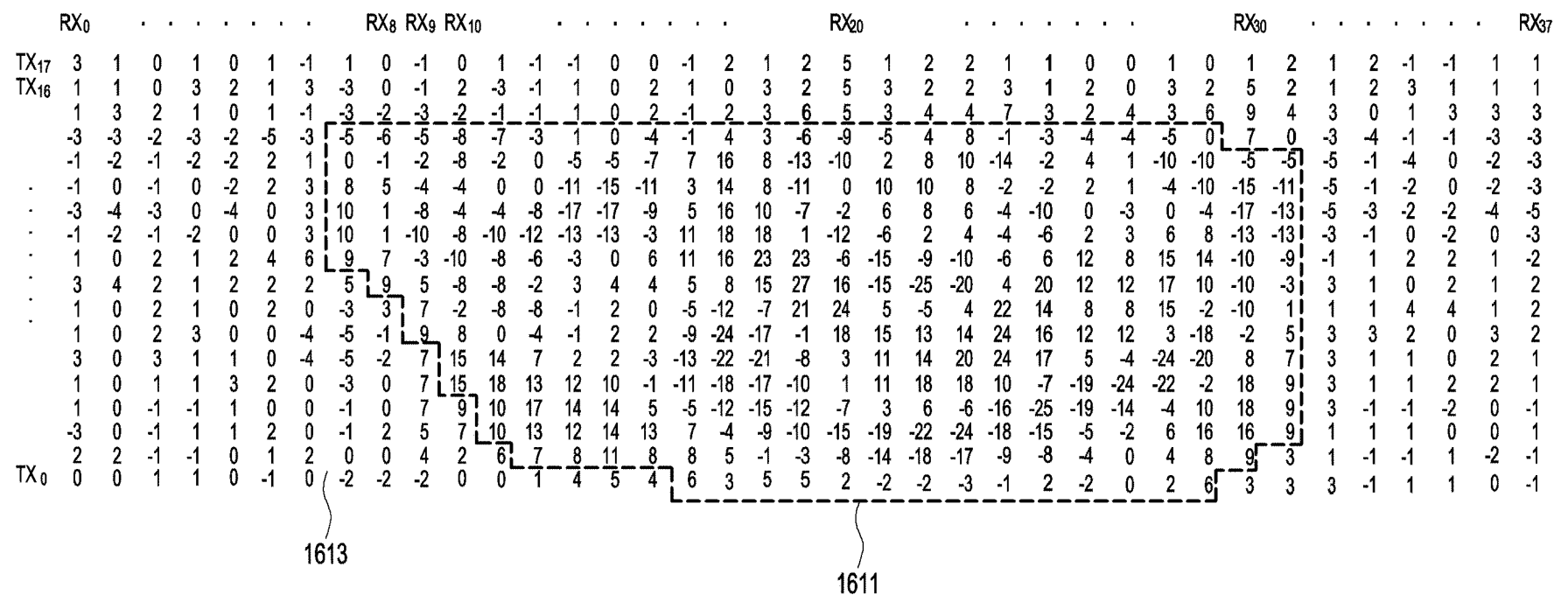

As illustrated in FIG. 16A, the signal strength of the area 1601 in contact with the object exceeds the first threshold (e.g., noise level), and the signal strength of the area 1603 not in contact with the object may be less than or equal to the first threshold. Further, as illustrated in FIG. 16B, the magnitude of the signal in the area 1611 in contact with the object may exceed the first threshold (e.g., noise level), and the signal in the area 1613 not in contact with the object may be less than or equal to the first threshold. If the number of nodes corresponding to the areas 1601 and 1611 in contact with the object exceeds the second threshold, it may be a data signal by the object in contact with a large area, and thus the touch may not be one intended by the user. In other words, if there is included data whose signal data strength exceeds the first threshold, and the number of nodes in which the strength of signal data exceeds the first threshold is more than the second threshold, the touch may be not one intended by the user, such as when the electronic device 101 contacts the user's body or a magnetic card.

In operation 1407, the electronic device 101 (e.g., the touch circuit 250) may identify the area including nodes having values exceeding the first threshold. The area including nodes having values exceeding the first threshold may be any one of an area which is determined to be touched by an object, an area adjacent to the area which is determined to be touched by the object, and an entire area in which a touch may be input, but is not limited thereto.

In operation 1409, the electronic device 101 (e.g., the touch circuit 250) may output, to the processor, information associated with a touch to at least one surface of the electronic device as reflected by the signal data and the area including the node having a value exceeding the first threshold. The electronic device 101 may discard information associated with a touch to the area including a node having a signal strength exceeding the first threshold. The electronic device 101 may output, to the processor, information associated with a touch to an area which is not the area including the node having a signal strength exceeding the first threshold. It is thus possible to prevent a malfunction due to an erroneous touch to the user's body in the pocket.

In operation 1411, the electronic device 101 (e.g., the touch circuit 250) may output information associated with a touch to at least one surface of the electronic device to the processor as reflected by the signal data.

Figure 17:
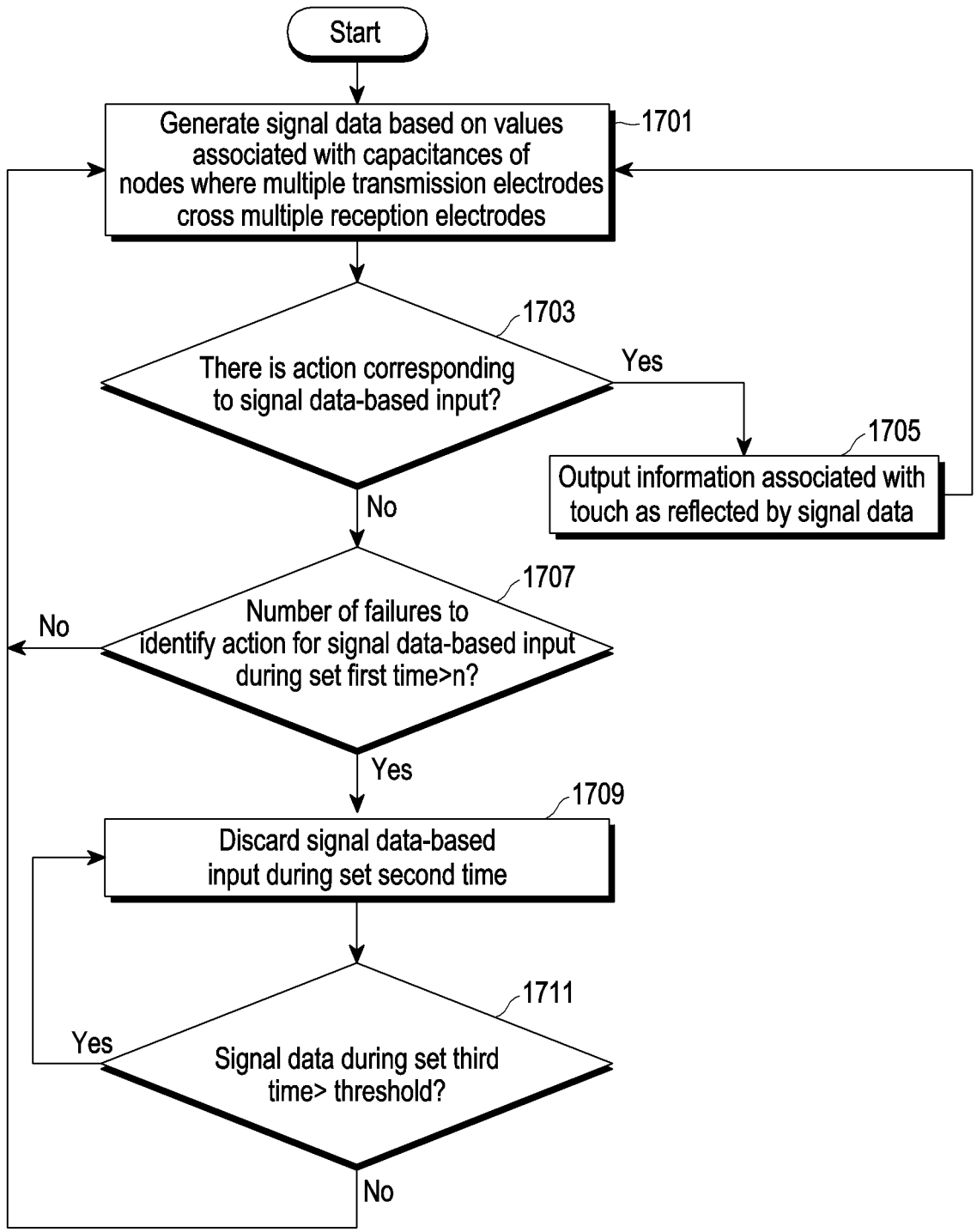
FIG. 17 is a flowchart illustrating an operation method of an electronic device according to an embodiment.

FIG. 17 is a flowchart illustrating an operation method of an electronic device according to an embodiment.

Referring to FIG. 17, in operation 1701, the electronic device 101 (e.g., the touch circuit 250) may generate signal data based on values associated with the capacitances of nodes where a plurality of transmission electrodes and a plurality of reception electrodes cross each other. The touch circuit 250 may generate the difference between the values associated with the per-node capacitances and the baseline, as signal data. For example, the signal data may include data corresponding to each node.

In operation 1703, the electronic device 101 (e.g., the touch circuit 250) may identify whether there is an action corresponding to a signal data-based input. For example, the electronic device 101 may identify a distance between user touches, a time between the touches, or a touch to an effective area based on the signal data. The electronic device 101 may identify whether the action corresponding to the user's input is a double tap, a swipe, or the like.

If there is an action corresponding to a signal data-based input, the electronic device 101 (e.g., the touch circuit 250) may output information associated with a touch to at least one surface of the electronic device to the processor as reflected by the signal data in operation 1705.

If there is no action corresponding to the signal data-based input, the electronic device 101 (e.g., the touch circuit 250) may identify whether the number of failures to identify an action corresponding to a signal data-based input is n or more during a set first time period in operation 1707. For example, the electronic device 101 may determine whether inputs without a corresponding action are 4 or more for 3 seconds.

If the number of failures to identify an action corresponding to a signal data-based input during the set first time is less than n, the electronic device 101 (e.g., the touch circuit 250) may return to operation 1701, generating differences between the values associated with per-node capacitances and the baseline as signal data.

If the number of failures to identify an action corresponding to the signal data-based input during the set time is greater than n, the electronic device 101 (e.g., the touch circuit 250) may discard signal data-based inputs during a set second time period in operation 1709. For example, when input without a corresponding action is repeated n times during the first time period, that may be a situation in which the user does not intend the touch, thus, it is possible to prevent input of a false touch by discarding input during the set second time.

In operation 1711, the electronic device 101 (e.g., the touch circuit 250) may identify whether signal data exceeding a threshold is generated during a set third time period. For example, the electronic device 101 may identify whether signal data having a magnitude exceeding a threshold (e.g., noise level) is generated for 300 ms. For example, if the magnitude of all signal data generated for 300 ms is less than or equal to the threshold, the electronic device 101 may return to operation 1701. When the size of all signal data generated for 300 ms is less than or equal to the threshold, that may be a situation in which repeated input of a touch not intended by the user.

Figure 18:
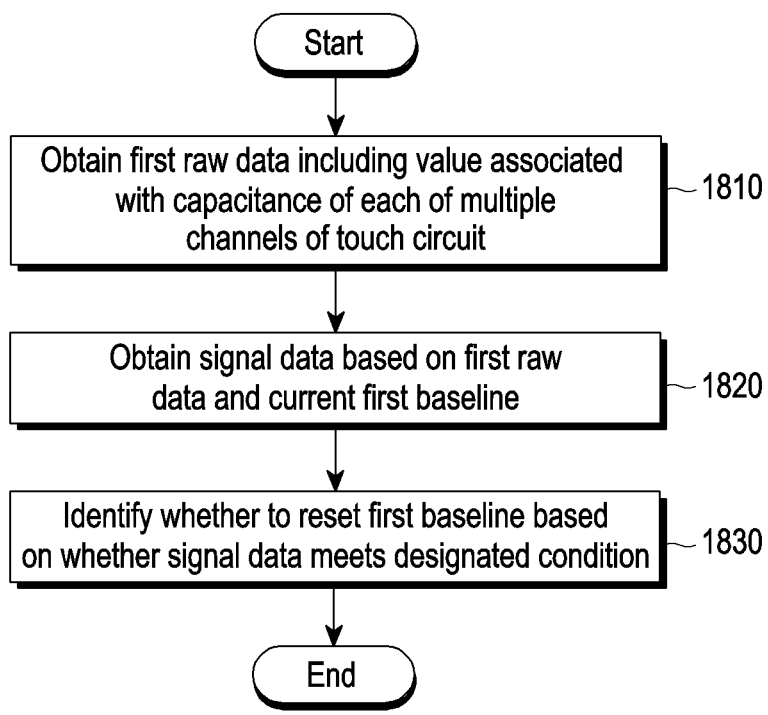
FIG. 18 is a flowchart illustrating an operation method of an electronic device according to an embodiment.

FIG. 18 is a flowchart illustrating an operation method of an electronic device according to an embodiment. When the electronic device 101 performs a specific operation, it may mean that a hardware device (e.g., the touch circuit 250) in the electronic device 101 performs the specific operation. In this case, the hardware device (e.g., the touch circuit 250) by itself may perform the specific operation by a control circuit (e.g., the touch sensor IC 253) in the hardware device. Alternatively, when the electronic device 101 performs a specific operation, it may mean that the processor 120 performs the specific operation or a hardware device (e.g., the touch sensor IC 253, the display driver IC 230, or the display 210) performs the specific operation based on the control of the processor 120. Alternatively, when the electronic device 101 performs a specific operation, it may mean that an instruction to enable the processor 120 or a hardware device other than the processor 120 to perform the specific operation is executed. In this case, performing a specific operation may mean that an instruction to enable the specific operation to be performed is stored in the memory 130.

Referring to FIG. 18, according to an embodiment, in operation 1810, the electronic device 101 (e.g., the touch circuit 250) may obtain first raw data including values associated with a plurality of per-channel capacitances of the touch circuit. For example, the touch circuit 250 may include a plurality of transmission channels and a plurality of reception channels that cross each other. When the plurality of transmission channels and the plurality of reception channels cross, it may mean that transmission electrodes connected to the transmission channels are arranged in a first direction, and reception electrodes connected to the reception channels are arranged in a second direction perpendicular to the first direction so that the transmission electrodes and the reception electrodes cross each other. In this case, the touch circuit 250 may receive an electrical signal from each of the reception channels, and based thereupon, identify the capacitance formed between the transmission channel and the reception channel. For example, the electrical signal is an analog signal and may be converted into a digital signal. The raw data may be a digital signal itself or data (e.g., capacitance) generated based on the digital signal. The raw data may include a plurality of per-channel (or per-node) values.

In operation 1820, the electronic device 101 (e.g., the touch circuit 250) may obtain signal data based on the first raw data and a current first baseline. For example, the electronic device 101 (e.g., the touch circuit 250) may generate signal data according to a difference between the obtained first raw data and a first baseline that is the current baseline.

In operation 1830, the electronic device 101 (e.g., the touch circuit 250) may identify whether to reset the first baseline based on whether the signal data meets a designated condition. For example, the electronic device 101 (e.g., the touch circuit 250) may delay the reset of the baseline based on whether the signal data meets the designated condition before resetting the baseline. In an embodiment, since a different baseline is obtained depending on the on mode or the off mode of the display (e.g., the display 210), the electronic device 101 (e.g., the touch circuit 250) may identify whether the signal data before the display switches between on and off meets the designated condition and, upon performing on/off of the display, identify whether to reset the current baseline.

For example, the designated condition may be at least one of when the signal data is determined to be an erroneous touch or when the value of the signal data meets a preset threshold range. For example, when the signal data is determined to be an erroneous touch may be when a touch is sensed before the display switches from on to off when the electronic device 101 is determined to be in the pocket or a bag. In this case, the electronic device 101 (e.g., the touch circuit 250) may delay the reset of the first baseline if the designated condition is met.

According to an embodiment, in the electronic device 101 (e.g., the touch circuit 250) may identify whether the morphological characteristics of the signal data corresponding to a touch sensed before the display switches from on and to are maintained even after the display switches between on and off and, if the morphological characteristics of the signal data are not identified, identify that the erroneous touch state has been released.

According to an embodiment, if the erroneous touch state is released or the value of the signal data falls out of a preset threshold range, the electronic device 101 (e.g., the touch circuit 250) may reset the current baseline.

As described above, according to certain embodiments of the disclosure, it is possible to prevent an inaccurate baseline from being obtained, thereby enhancing the accuracy of touch recognition after the display switches between on and off.

Figure 19:
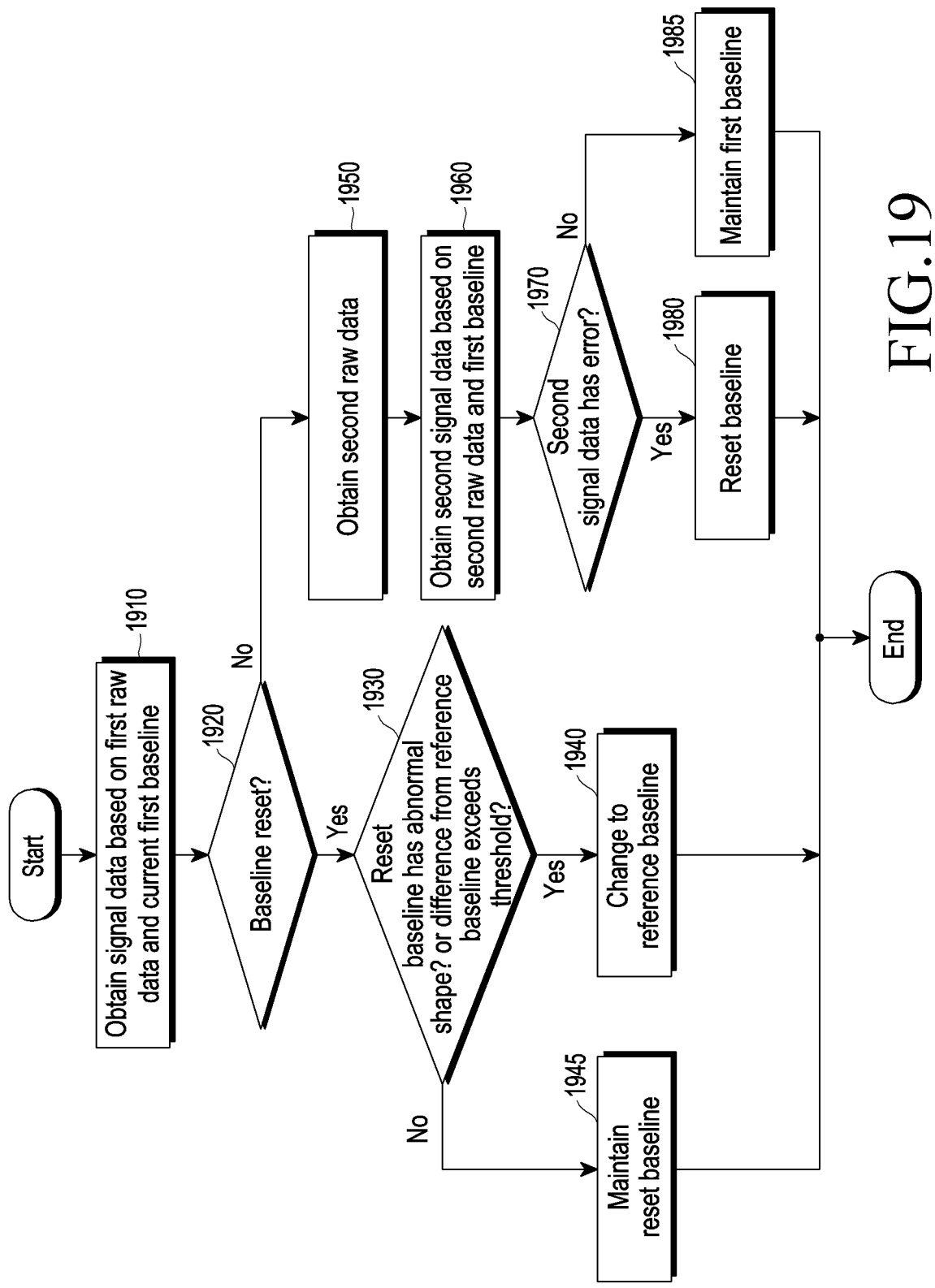
FIG. 19 is a flowchart illustrating an operation method of an electronic device according to an embodiment.

FIG. 19 is a flowchart illustrating an operation method of an electronic device according to an embodiment. Referring to FIG. 19, according to an embodiment, in operation 1910, the electronic device 101 (e.g., the touch circuit 250) may obtain signal data based on the first raw data and a current first baseline. In operation 1920, the electronic device 101 (e.g., the touch circuit 250) may determine whether to reset the baseline. Operations 1910 and 1920 are the same as operations 1820 and 1830 of FIG. 18, and thus, no duplicate description thereof is given.

Upon identifying to reset the baseline (Y in operation 1920), the electronic device 101 (e.g., the touch circuit 250) may reset the existing first baseline in operation 1930. For example, the reset baseline may be referred to as a second baseline.

However, even when the baseline reset operation is performed, there may arise a case in which a touch is input at the moment that the baseline is reset, so that the baseline is reset with the input touch taken into account. In this case, the reset baseline (the second baseline) is inaccurate, so that the touch performance may be degraded.

Accordingly, in operation 1930, the electronic device 101 (e.g., the touch circuit 250) may identify whether the reset baseline has an abnormal shape or whether there are one or more channels in which the difference from a reference baseline exceeds a threshold.

For example, due to the baseline reset, signal data which is a difference between the raw data and the baseline may be initialized, and the electronic device 101 (e.g., the touch circuit 250) may identify whether the baseline is one usable for touch recognition based on the shape of the reset baseline.

Figure 20A:
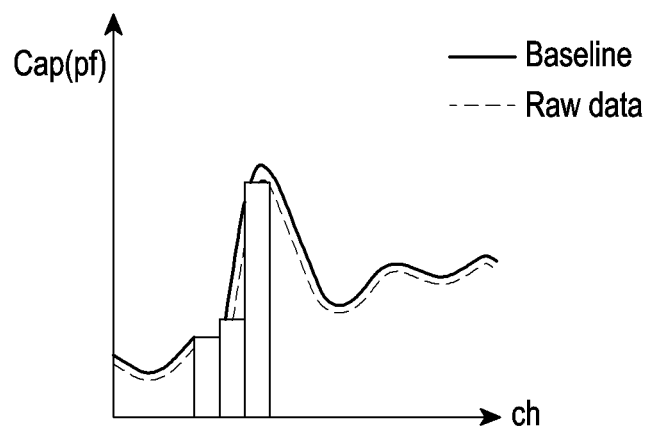
FIG. 20A is a graph illustrating a baseline according to an embodiment.

For example, as illustrated in FIG. 20A, if the difference between the values respectively corresponding to a first channel and a second channel adjacent to each other, of the reset baseline, exceeds a threshold, the electronic device 101 (e.g., the touch circuit 250) may identify that the reset baseline is not available for accurate touch recognition.

Figure 20B:
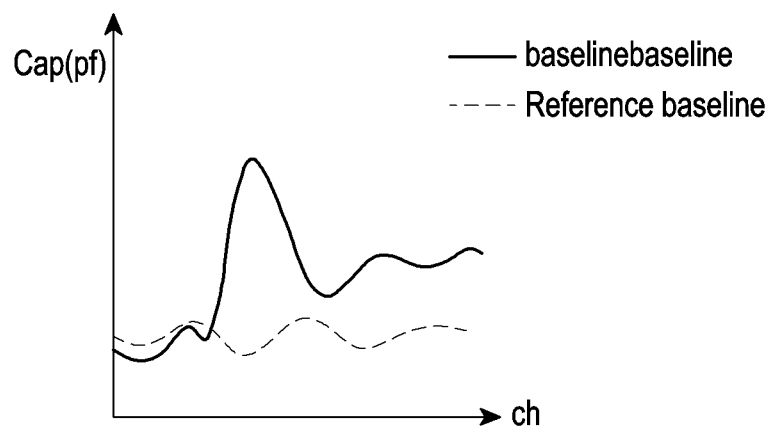
FIG. 20B is a graph illustrating a baseline according to an embodiment.

As another embodiment, as illustrated in FIG. 20B, if there are one or more channels in which the difference between the reset baseline and the reference baseline exceeds the threshold, the electronic device 101 (e.g., the touch circuit 250) may identify that the reset baseline is not available for accurate touch recognition. Here, the reference baseline is obtained while the state in which there is no touch input is maintained and may be a baseline corresponding to a case in which a calibration offset is applied, or may be previously stored in a memory (e.g., the memory 130).

If there is an abnormality in the shape of the reset baseline itself, or it is identified that one or more channels in which the difference from the reference baseline exceeds the threshold (Y in operation 1930), the electronic device 101 (e.g., the touch circuit 250) may change the reset baseline to the reference baseline in operation 1940. As another embodiment, if the reset baseline is an incorrect baseline, the electronic device 101 (e.g., the touch circuit 250) may perform baseline reset again.

If there is no abnormality in the reset baseline (N in operation 1930), the electronic device 101 (e.g., the touch circuit 250) may maintain the reset baseline in operation 1945.

Upon identifying not to reset the baseline (N in operation 1920), the electronic device 101 (e.g., the touch circuit 250) may obtain second raw data in operation 1950. In this case, as the baseline is not reset, the first baseline may be used.

According to an embodiment, upon determining whether there is an erroneous touch without resetting the baseline even when the display switches between on and off, the electronic device 101 (e.g., the touch circuit 250) may reinforce the strength of noise filtering or apply a separate filter considering the noise characteristics of the display.

In operation 1960, the electronic device 101 (e.g., the touch circuit 250) may obtain second signal data based on the second raw data and the first baseline. For example, the electronic device 101 (e.g., the touch circuit 250) may generate signal data according to a difference between the obtained second raw data and the first baseline maintained without resetting the baseline.

In operation 1970, the electronic device 101 (e.g., the touch circuit 250) may identify whether the second signal data has an error. For example, although the second signal data is obtained using the obtained second raw data while maintaining the first baseline without resetting the baseline, if the second signal data has an error (Y in operation 1970), the electronic device 101 (e.g., the touch circuit 250) may perform a baseline reset in operation 1980. For example, if the shape of the second signal data has an abnormal shape, the electronic device 101 (e.g., the touch circuit 250) may determine that there is an error in the second signal data. For example, if the second signal data has a shape in which positive and negative portions are repeated, or the negative section is larger than a designated size, or there is a negative value not less than a designated value, the electronic device 101 (e.g., the touch circuit 250) may determine that the shape of the second signal data is an abnormal shape and reset the baseline.

If it is identified that there is no error in the second signal data (N in operation 1970), the electronic device 101 (e.g., the touch circuit 250) may maintain the first baseline in operation 1985.

As described above, according to certain embodiments of the disclosure, it is possible to increase the touch recognition rate in the pocket or a bag by avoiding display noise through delaying the reset of the baseline while reducing a malfunction due to noise of other nature, such as from a magnet, coil, or moisture.

Figure 21:
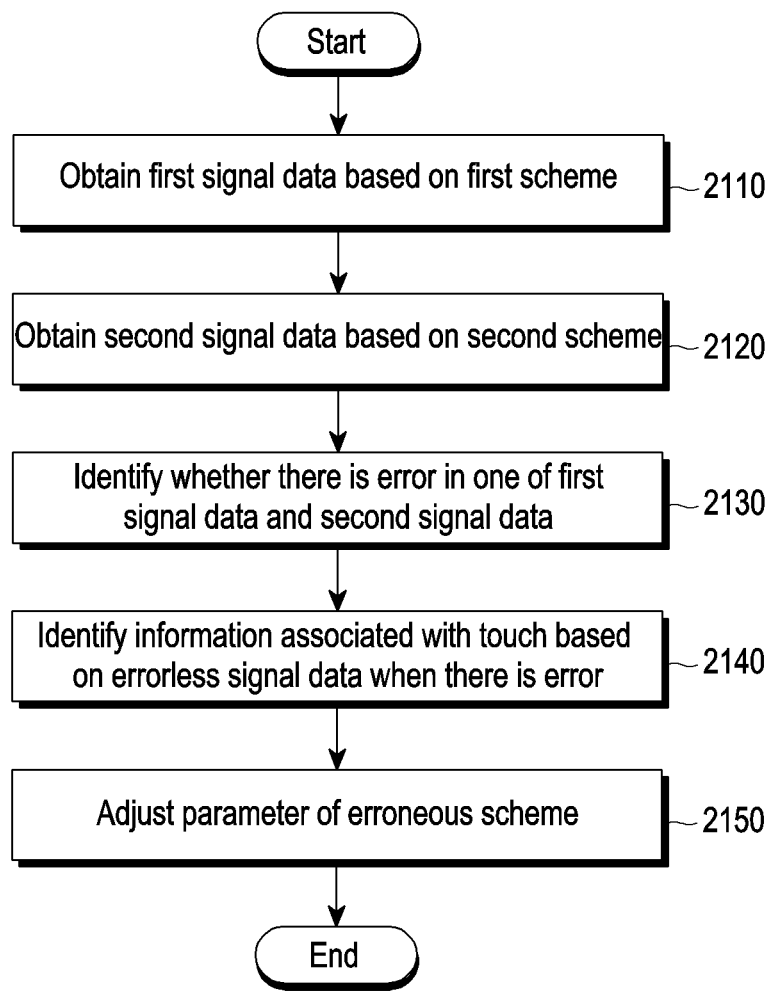
FIG. 21 is a flowchart illustrating an operation method of an electronic device according to an embodiment.
Figure 22A:
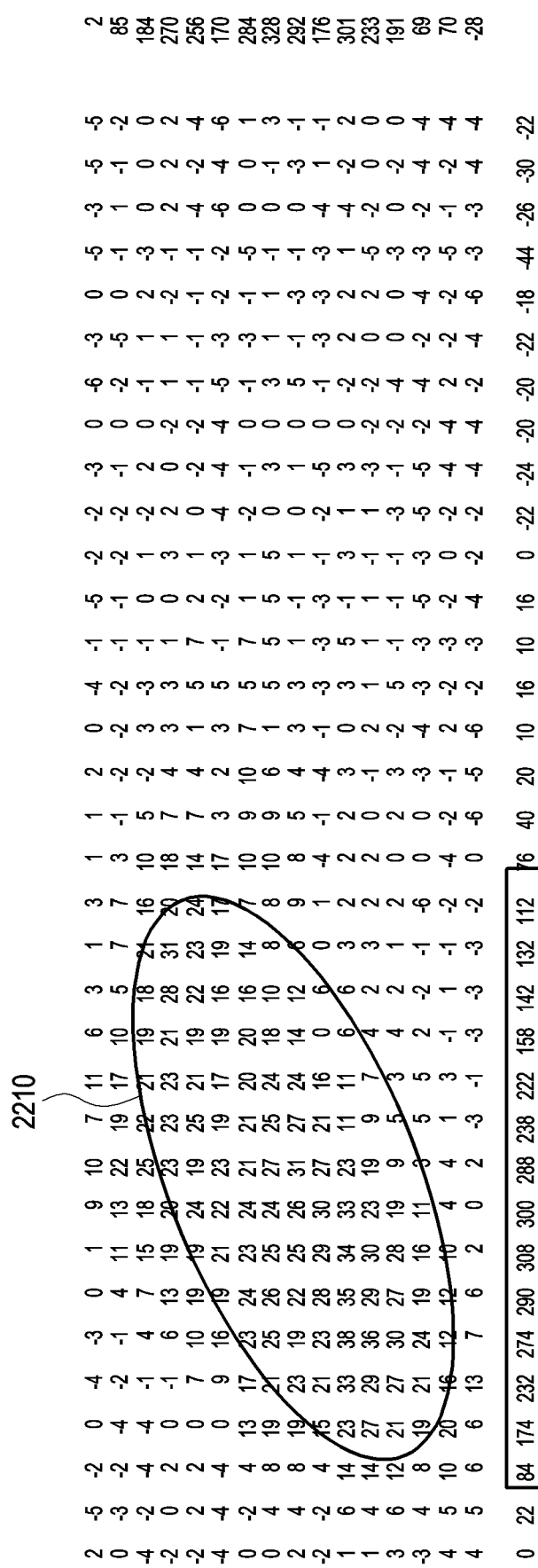
FIG. 22A is a view illustrating signal data according to an embodiment.

FIG. 21 is a flowchart illustrating an operation method of an electronic device according to an embodiment. The embodiment of FIG. 21 is described with reference to FIGS. 22A and 2B. FIG. 22A and FIG. 2B are views for describing signal data obtained based on two types of schemes.

Referring to FIG. 21, according to an embodiment, in operation 2110, the electronic device 101 (e.g., the touch circuit 250) may obtain first signal data based on a first scheme. In operation 2120, the electronic device 101 (e.g., the touch circuit 250) may obtain second signal data based on a second scheme. For example, the electronic device 101 (e.g., the touch circuit 250) may obtain at least one first signal data based on a mutual capacitance scheme and, based on a self-capacitance scheme, obtain at least one second signal data. In operation 2130, the electronic device 101 (e.g., the touch circuit 250) may identify that there is an error in one of the first signal data and the second signal data. For example, a touch may be sensed based on the mutual capacitance scheme, but no may be sensed based on the self-capacitance scheme. This may be an important factor in controlling malfunctions and when the electronic device 101 continuously determines whether the in-pocket (e.g., in the pocket or bag) state is maintained. This is because various types of capacitance data may appear in the pocket due to a hall IC of a phone cover or coins or car key in the pocket. This is also because there is a possibility that the detected capacitance may be distorted by a change in temperature of the electronic device 101 due to use of processors that can generate heat moisture (sweat or makeup), or gripping.

According to an embodiment, in operation 2140, if there is an error, the electronic device 101 (e.g., the touch circuit 250) may identify touch-associated information based on signal data that has no error. In operation 2150, the electronic device 101 (e.g., the touch circuit 250) may generate the parameters of the scheme that has caused an error. For example, the electronic device 101 (e.g., the touch circuit 250) may determine whether the electronic device is in-pocket depending on the profile type and duration of the signal data, and may dynamically adjust, e.g., determination conditions or thresholds. For example, if the temperature of the electronic device 101 increases, the threshold related to touch sensitivity may be increased.

According to an embodiment, referring to FIG. 22A, the electronic device 101 (e.g., the touch circuit 250) may obtain the first signal data 2210 based on the mutual capacitance scheme and, based on the self-capacitance scheme, obtain the second signal data 2211. In a normal case, the positions of nodes of data exceeding a threshold in the first signal data 2210 may correspond to the positions of channels of data exceeding a threshold in the second signal data 2211.

For example, the electronic device 101 (e.g., the touch circuit 250) may identify that the profile of the first signal data 2210 corresponds to the shape of the second signal data 2211 and identify that the electronic device 101 is in-pocket and in the state of touching a thigh.

Figure 22B:
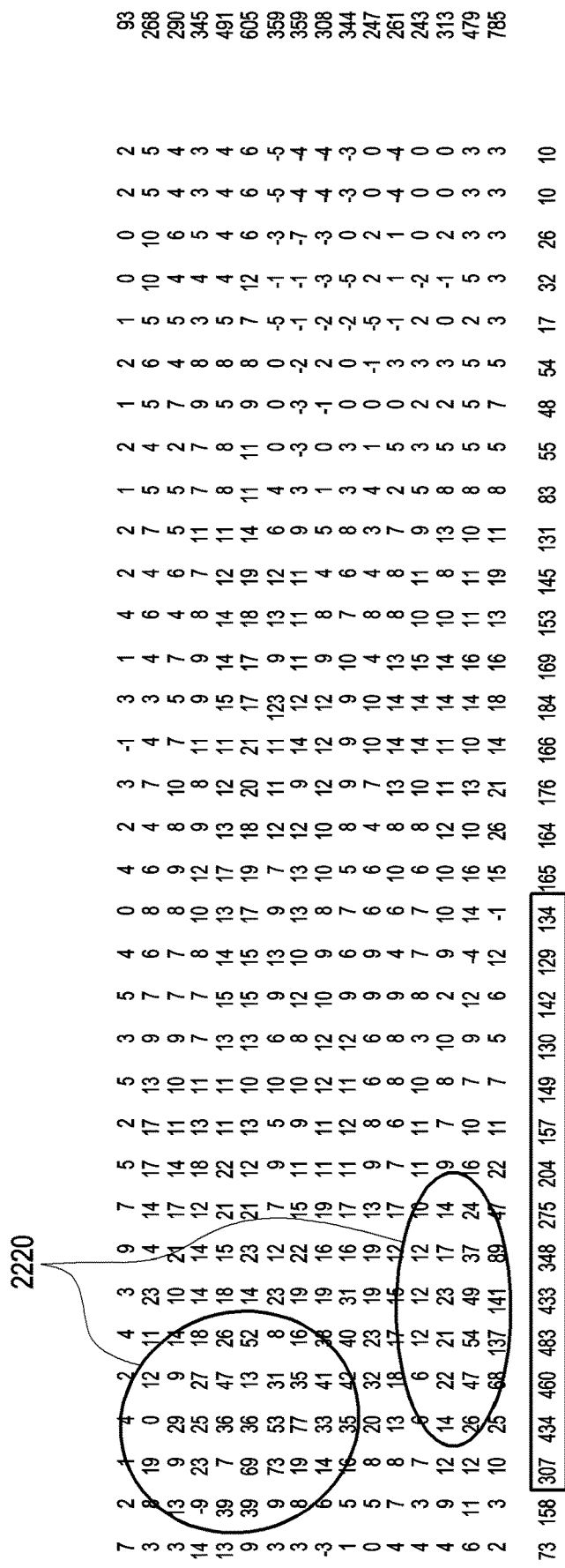
FIG. 22B is a view illustrating signal data according to an embodiment.

As another embodiment, referring to FIG. 22B, the electronic device 101 (e.g., the touch circuit 250) may obtain the first signal data 2220 based on the mutual capacitance scheme and, based on the self-capacitance scheme, obtain the second signal data 2221. Although the signal data illustrated in FIG. 22B has an energy form (e.g., sum of energy) that matches the in-pocket condition, the curvature between adjacent nodes is large and the shape is not circular, so that the electronic device 101 (e.g., touch circuit 250) may identify that it is not in-pocket and the touch is one caused by a magnet or moisture.

Figure 23:
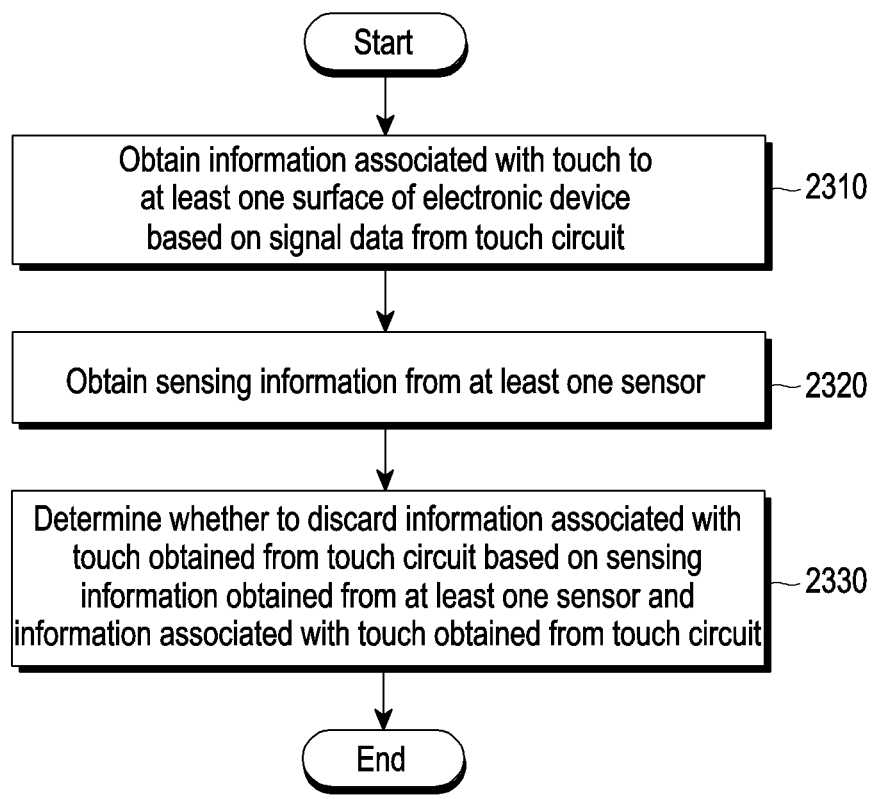
FIG. 23 is a flowchart illustrating an operation method of an electronic device according to an embodiment.

FIG. 23 is a flowchart illustrating an operation method of an electronic device according to an embodiment. FIG. 23 illustrates an embodiment of identifying information associated with an ear touch, by further using sensing data from another sensor.

According to an embodiment, in operation 2310, the electronic device 101 (e.g., the processor 120) may obtain (e.g., receive) information associated with a touch to at least one surface of the electronic device 101 based on signal data from the touch circuit 250. In operation 2320, the electronic device 101 (e.g., the processor 120) may obtain (e.g., receive) sensing information from at least one sensor (e.g., the sensor module 176). For example, the at least one sensor may be, e.g., a gyro sensor, an acceleration sensor, an illuminance sensor, or an ultrasonic sensor. There is no limitation on the type of sensor additionally used by the processor 120.

According to an embodiment, in operation 2330, the electronic device 101 (e.g., the processor 120) may determine whether to discard information associated with a touch obtained from the touch circuit 250 based on sensing information obtained from at least one sensor (e.g., the sensor module 176) and information associated with a touch to at least one surface of the electronic device 101 based on signal data obtained from the touch circuit 250. For example, even when the electronic device 101 meets the condition of the in-pocket state based on the signal data obtained from the touch circuit 250, the electronic device 101 (e.g., the processor 120) may identify that it is not in the in-pocket further in consideration of the sensing information from the illuminance sensor, gyro sensor, and/or acceleration sensor.

For example, if the electronic device 101 is in-pocket based on the sensing information obtained from the illuminance sensor and the signal data obtained from the touch circuit 250, the electronic device 101 (e.g., the processor 120) may identify that the input touch is false, switch the display into the on mode in response to the input touch, display an anti-malfunction user interface or, despite the touch input, refrain from switching the display into the on mode. In this case, the electronic device 101 (e.g., the touch circuit 250) may perform a baseline reset operation according to the disclosure.

As another embodiment, although the electronic device 101 is in-pocket state based on the signal data obtained from the touch circuit, if the illuminance value obtained by the illuminance sensor is a designated value or more, or the sensing information obtained from the gyro sensor and/or the acceleration sensor includes the signal form of when the electronic device 101 is pulled out of the pocket, the electronic device 101 (e.g., the processor 120) may determine that the electronic device 101 is not in in-pocket. According to an embodiment, if it is determined that the electronic device 101 is not in the in-pocket state, the electronic device 101 (e.g., the processor 120) may perform an operation corresponding to the touch. In this case, the electronic device 101 (e.g., the touch circuit 250) may perform a baseline reset operation according to the disclosure.

According to an embodiment, an electronic device (e.g., the electronic device 101) comprises a processor (e.g., the processor 120) and a touch circuit (e.g., the touch circuit 250) configured to output, to the processor (e.g., the processor 120), information associated with a touch to at least one surface of the electronic device, and the touch circuit (e.g., the touch circuit 250) may be configured to generate first raw data including a first value associated with capacitance for each of a plurality of channels of the touch circuit (e.g., the touch circuit 250), generate a first baseline based on the first raw data, identify whether the first raw data meets a designated condition, and identify whether to reset the first baseline based on whether the designated condition is met.

According to an embodiment, the designated condition may include a case in which a difference between data corresponding to a first channel and a second channel adjacent to each other among the first raw data exceeds a threshold.

According to an embodiment, the touch circuit (e.g., the touch circuit 250) may include a plurality of transmission channels arranged in a first direction and a plurality of reception channels arranged in a second direction orthogonal to the first direction, and the touch circuit (e.g., the touch circuit 250) may be configured to, as at least part of generating the first raw data, obtain a second value associated with capacitance of a first transmission channel among the plurality of transmission channels, from each of the plurality of reception channels, and generate the first raw data based on the second value associated with the capacitance obtained from each of the plurality of reception channels.

According to an embodiment, the touch circuit (e.g., the touch circuit 250) may be configured to generate second raw data including a third value associated with the capacitance for each of the plurality of channels after generating the first baseline and generate signal data based on the first baseline and the second raw data.

According to an embodiment, the touch circuit (e.g., the touch circuit 250) may be configured to output, to the processor (e.g., the processor 120), the information associated with the touch to the at least one surface of the electronic device (e.g., the electronic device 101) based on the signal data if it is identified not to reset the first baseline.

According to an embodiment, the touch circuit (e.g., the touch circuit 250) may be configured to discard the signal data if it is identified not to reset the first baseline.

According to an embodiment, the touch circuit (e.g., the touch circuit 250) may be configured to, as at least part of discarding the signal data, generate third raw data including a fourth value associated with the capacitance for each of the plurality of channels and generate a second baseline based on the third raw data and reset the first baseline to the second baseline.

According to an embodiment, the touch circuit (e.g., the touch circuit 250) may be configured to generate new signal data based on the second baseline and the second raw data and output, to the processor (e.g., the processor 120), the information associated with the touch to the at least one surface of the electronic device (e.g., the electronic device 101) based on the new signal data.

According to an embodiment, the touch circuit (e.g., the touch circuit 250) may be configured to correct data corresponding to each of the first channel and the second channel using at least part of the first raw data other than the data corresponding to each of the first channel and the second channel a case in which the difference between the data corresponding to the first channel and the data corresponding to the second channel exceeds a threshold.

According to an embodiment, the touch circuit (e.g., the touch circuit 250) may be configured to, as at least part of identifying whether the first raw data meets the designated condition, identify whether a designated event occurs and identify whether the first raw data meets the designated condition based on whether the designated event has occurred.

According to an embodiment, the designated event includes at least part of a display mode switch, detection of connection of an external device, detection of a user's gripping, or detection of RF noise.

According to an embodiment, a method for operating an electronic device (e.g., the electronic device 101) including a touch circuit (e.g., the touch circuit 250) and a processor (e.g., the processor 120) may comprise generating first raw data including a first value associated with capacitance for each of a plurality of channels of the touch circuit (e.g., the touch circuit 250), by the touch circuit (e.g., the touch circuit 250), generating a first baseline based on the first raw data, by the touch circuit (e.g., the touch circuit 250), identifying whether the first raw data meets a designated condition, by the touch circuit (e.g., the touch circuit 250), and identifying whether to reset the first baseline based on whether the designated condition is met, by the touch circuit (e.g., the touch circuit 250).

According to an embodiment, the designated condition may include a case in which a difference between data corresponding to a first channel and a second channel adjacent to each other among the first raw data exceeds a threshold.

According to an embodiment, the touch circuit may include a plurality of transmission channels arranged in a first direction and a plurality of reception channels arranged in a second direction orthogonal to the first direction, And generating the first raw data may include obtaining a second value associated with capacitance of a first transmission channel among the plurality of transmission channels, from each of the plurality of reception channels, and generating the first raw data based on the second value associated with the capacitance obtained from each of the plurality of reception channels.

According to an embodiment, the method may further comprise generating second raw data including a third value associated with the capacitance for each of the plurality of channels after generating the first baseline, by the touch circuit (e.g., the touch circuit 250), and outputting, to the processor (e.g., the processor 120), signal data based on the first baseline and the second raw data, by the touch circuit (e.g., the touch circuit 250).

According to an embodiment, the method may further comprise outputting information associated with a touch to at least one surface of the electronic device (e.g., the electronic device 101) based on the signal data if it is identified not to reset the first baseline, by the touch circuit (e.g., the touch circuit 250), and discarding the signal data if it is identified to reset the first baseline, by the touch circuit (e.g., the touch circuit 250).

According to an embodiment, discarding the signal data may include generating third raw data including a fourth value associated with the capacitance for each of the plurality of channels, generating a second baseline based on the third raw data and resetting the first baseline to the second baseline, generating new signal data based on the second baseline and the second raw data, and outputting the information associated with the touch to the at least one surface of the electronic device (e.g., the electronic device 101) based on the new signal data.

According to an embodiment, an electronic device (e.g., the electronic device 101) comprises a processor (e.g., the processor 120), and a touch circuit (e.g., the touch circuit 250) configured to output, to the processor (e.g., the processor 120), information associated with a touch to at least one surface of the electronic device (e.g., the electronic device 101), and the touch circuit (e.g., the touch circuit 250) may be configured to generate first raw data including a value associated with a capacitance for each of a plurality of channels of the touch circuit (e.g., the touch circuit 250) at a first time, generate a baseline based on the first raw data, generate second raw data including the value associated with the capacitance for each of the plurality of channels of the touch circuit (e.g., the touch circuit 250) at a second time, process, in a first scheme, data corresponding to each of a first channel and a second channel among the second raw data, based on a difference between data respectively corresponding to the first channel and the second channel adjacent to each other among the first raw data being not more than a threshold, and process, in a second scheme, the data corresponding to each of the first channel and the second channel among the second raw data, based on the difference between data respectively corresponding to the first channel and the second channel adjacent to each other among the first raw data exceeding the threshold.

According to an embodiment, the touch circuit (e.g., the touch circuit 250) may be configured to, as at least part of processing in the first scheme, generate signal data corresponding to each of the first channel and the second channel based on the data corresponding to each of the first channel and the second channel and the baseline.

According to an embodiment, the touch circuit (e.g., the touch circuit 250) may be configured to, as at least part of processing in the second scheme, correcting the baseline and generate signal data corresponding to each of the first channel and the second channel based on the data corresponding to each of the first channel and the second channel and the corrected baseline.

According to an embodiment, an electronic device (e.g., the electronic device 101) comprises a processor and a touch circuit configured to output, to the processor, information associated with a touch to at least one surface of the electronic device, and the touch circuit may include a plurality of transmission channels corresponding to a plurality of transmission electrodes arranged in a first direction and a plurality of reception channels corresponding to a plurality of reception electrodes arranged in a second direction orthogonal to the first direction, and generate signal data based on values associated with capacitances of nodes where the plurality of transmission electrodes cross the plurality of reception electrodes, the signal data including data corresponding to each of the nodes, identify whether the signal data meets a designated condition, discard the signal data in response to the signal data meeting the designated condition, and output, to the processor, the information associated with the touch to the at least one surface of the electronic device based on the signal data in response to the signal data failing to meet the designated condition.

According to an embodiment, the designated condition may include a case in which at least part of the signal data is smaller than a negative first threshold.

According to an embodiment, the touch circuit (e.g., the touch circuit 250) may be configured to, as part of discarding the signal data, discard the signal data of an area including a node having a value smaller than the negative first threshold.

According to an embodiment, the designated condition may include a case in which a number of nodes in which a magnitude of the signal data exceeds a second threshold exceeds a third threshold.

According to an embodiment, the touch circuit (e.g., the touch circuit 250) may be configured to, as at least part of discarding the signal data, discard the signal data of an area including a node in which the magnitude of the signal data exceeds the second threshold.

According to an embodiment, the designated condition may include a case in which a number of continuous failures to identify an action corresponding to an input based on the signal data is equal to or greater than a preset number, and the touch circuit (e.g., the touch circuit 250) may be configured to, as at least part of discarding the signal data, discard the signal data during a set time period from when the designated condition is met.

According to an embodiment, an electronic device (e.g., the electronic device 101) may include a processor and a touch circuit configured to output, to the processor, information associated with a touch to at least one surface of the electronic device, the touch circuit may be configured to obtain first raw data including a first value associated with capacitance for each of a plurality of channels of the touch circuit, obtain signal data based on the first raw data and a current first baseline, and identify whether to reset the first baseline based on whether the signal data meets a designated condition.

According to an embodiment, the designated condition may include at least one of when the signal data is determined to include an erroneous touch or when a second value of the signal data meets a preset threshold range, the touch circuit (e.g., the touch circuit 250) may be configured to delay the reset of the first baseline if the designated condition is met.

According to an embodiment, the touch circuit (e.g., the touch circuit 250) may be configured to obtain second raw data including a third value associated with the capacitance for each of the plurality of channels, while the reset of the first baseline is delayed, obtain new signal data based on the first baseline and the second raw data, and reset the first baseline if the new signal data is determined to have an error.

According to an embodiment, the electronic device (e.g., the electronic device 101) may further comprise a memory (e.g., the memory 130), wherein the memory may store information for a reference baseline obtained when there is no touch input, and the touch circuit (e.g., the touch circuit 250) may be configured to, after resetting the first baseline to a second baseline, change the second baseline to the reference baseline if a difference between values corresponding to a first channel and a second channel adjacent to each other in the second baseline exceeds a threshold or if there are one or more channels in which a difference between the second baseline and the reference baseline exceeds a threshold.

According to an embodiment, the touch circuit (e.g., the touch circuit 250) may be configured to obtain first signal data based on a first scheme, obtain second signal data based on a second scheme, identify information associated with a touch based on an errorless signal data among the first signal data and the second signal data when one of the first signal data and the second signal data has an error, and adjust a parameter of a scheme in which the error has occurred.

According to an embodiment, the electronic device (e.g., the electronic device 101) may further comprise at least one sensor (e.g., the sensor module 176), and the processor (e.g., the processor 120) may be configured to obtain the information associated with the touch to the at least one surface of the electronic device (e.g., the electronic device 101) based on the signal data from the touch circuit (e.g., the touch circuit 250), obtain sensing information from the at least one sensor, and determine whether to discard the information associated with the touch received from the touch circuit (e.g., the touch circuit 250) based on the information associated with the touch received from the touch circuit (e.g., the touch circuit 250) and the sensing information obtained from the at least one sensor.

According to various embodiments of the disclosure, the master device or task performing device may be various types of devices. The master device or task performing device may include, for example, a portable communication device (e.g., a smart phone), a computer device, a portable multimedia device, a portable medical device, a camera, a wearable device, or a home appliance. According to an embodiment of the disclosure, the master device or task performing device is not limited to the above-described devices.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a processor; and
a touch circuit configured to output, to the processor, information associated with a touch to at least one surface of the electronic device,
wherein the touch circuit is configured to:
generate first raw data including a first value associated with capacitance for each of a plurality of channels of the touch circuit,
generate a first baseline based on the first raw data,
identify whether the first raw data meets a designated condition, and identify to reset the first baseline based on the designated condition being met, reset the first baseline based on the designated condition being met, wherein the designated condition includes a case in which a difference between data among the first raw data exceeds a threshold, wherein the data includes a value associated with a first channel and a value associated with a second channel, wherein the first channel and the second channel are adjacent to each other.

2. The electronic device of claim 1, wherein the touch circuit includes a plurality of transmission channels arranged in a first direction and a plurality of reception channels arranged in a second direction orthogonal to the first direction, and wherein the touch circuit is configured to, as at least part of generating the first raw data, obtain a second value associated with capacitance of a first transmission channel among the plurality of transmission channels, from each of the plurality of reception channels, and generate the first raw data based on the second value associated with the capacitance obtained from each of the plurality of reception channels.

3. The electronic device of claim 1, wherein the touch circuit is configured to generate second raw data including a third value associated with the capacitance for each of the plurality of channels after generating the first baseline and generate signal data based on the first baseline and the second raw data.

4. The electronic device of claim 3, wherein the touch circuit is configured to output, to the processor, the information associated with the touch to the at least one surface of the electronic device based on the signal data in response the first baseline not being reset.

5. The electronic device of claim 3, wherein the touch circuit is configured to discard the signal data in response the first baseline being reset.

6. The electronic device of claim 5, wherein the touch circuit is configured to, as at least part of discarding the signal data, generate third raw data including a fourth value associated with the capacitance for each of the plurality of channels and generate a second baseline based on the third raw data and reset the first baseline to the second baseline.

7. The electronic device of claim 6, wherein the touch circuit is configured to generate new signal data based on the second baseline and the second raw data and output, to the processor, the information associated with the touch to the at least one surface of the electronic device based on the new signal data.

8. The electronic device of claim 1, wherein the touch circuit is configured to correct data corresponding to each of the first channel and the second channel using at least part of the first raw data other than the data corresponding to each of the first channel and the second channel in response to the difference between the data corresponding to the first channel and the data corresponding to the second channel exceeding the threshold.

9. The electronic device of claim 1, wherein the touch circuit is configured to, as at least part of identifying whether the first raw data meets the designated condition, identify whether a designated event occurs and identify whether the first raw data meets the designated condition based on whether the designated event has occurred.

10. The electronic device of claim 9, wherein the designated event includes a display mode switch, detection of connection of an external device, detection of a user's gripping, and/or detection of RF noise.

11. A method for operating an electronic device including a touch circuit and a processor, the method comprising:

generating first raw data including a first value associated with capacitance for each of a plurality of channels of the touch circuit, by the touch circuit;

generating a first baseline based on the first raw data, by the touch circuit;

identifying whether the first raw data meets a designated condition, by the touch circuit; and identifying to reset the first baseline based on the designated condition being met, by the touch circuit, reset the first baseline based on the designated condition being met, wherein the designated condition includes a case in which a different between data among the first raw data exceeds a threshold, wherein the data includes a value associated with a first channel and a value associated with a second channel, wherein the first channel and the second channel are adjacent to each other.

12. The method of claim 11, wherein the touch circuit includes a plurality of transmission channels arranged in a first direction and a plurality of reception channels arranged in a second direction orthogonal to the first direction, and wherein generating the first raw data includes obtaining a second value associated with capacitance of a first transmission channel among the plurality of transmission channels, from each of the plurality of reception channels, and generating the first raw data based on the second value associated with the capacitance obtained from each of the plurality of reception channels.

13. The method of claim 11, further comprising:

generating second raw data including a third value associated with the capacitance for each of the plurality of channels after generating the first baseline, by the touch circuit; and outputting, to the processor, signal data based on the first baseline and the second raw data, by the touch circuit.

14. The method of claim 13, further comprising:

outputting information associated with a touch to at least one surface of the electronic device based on the signal data in response to it being identified not to reset the first baseline, by the touch circuit; and discarding the signal data in response the first baseline not being reset, by the touch circuit.

15. The method of claim 14, wherein discarding the signal data further comprises:

generating third raw data including a fourth value associated with the capacitance for each of the plurality of channels;

generating a second baseline based on the third raw data and resetting the first baseline to the second baseline;

generating new signal data based on the second baseline and the second raw data; and outputting the information associated with the touch to the at least one surface of the electronic device based on the new signal data.

16. An electronic device, comprising:

a processor; and a touch circuit configured to output, to the processor, information associated with a touch to at least one surface of the electronic device, wherein the touch circuit is configured to generate first raw data including a value associated with a capacitance for each of a plurality of channels of the touch circuit at a first time, generate a baseline based on the first raw data, generate second raw data including the value associated with the capacitance for each of the plurality of channels of the touch circuit at a second time, process, in a first scheme, data corresponding to each of a first channel and a second channel among the first raw data, based on a difference between data respectively corresponding to the first channel and the second channel adjacent to each other among the first raw data being not more than a threshold, and process, in a second scheme, the data corresponding to each of the first channel and the second channel among the second raw data, based on the difference between data respectively corresponding to the first channel and the second channel adjacent to each other among the first raw data exceeding the threshold.

17. The electronic device of claim 16, wherein the touch circuit is configured to, as at least part of processing in the first scheme, generate signal data corresponding to each of the first channel and the second channel based on the data corresponding to each of the first channel and the second channel and the baseline.

18. The electronic device of claim 16, wherein the touch circuit is configured to, as at least part of processing in the second scheme, correct the baseline and generate signal data corresponding to each of the first channel and the second channel based on the data corresponding to each of the first channel and the second channel and the corrected baseline.

19. An electronic device, comprising:
a processor; and
a touch circuit configured to output, to the processor, information associated with a touch to at least one surface of the electronic device,
wherein the touch circuit includes a plurality of transmission channels corresponding to a plurality of transmission electrodes arranged in a first direction and a plurality of reception channels corresponding to a plurality of reception electrodes arranged in a second direction orthogonal to the first direction, and
wherein the touch circuit is configured to:
generate signal data based on values associated with capacitances of nodes where the plurality of transmission electrodes cross the plurality of reception electrodes, the signal data including data corresponding to each of the nodes,
identify whether the signal data meets a designated condition,
discard the signal data in response to the signal data meeting the designated condition,
output, to the processor, the information associated with the touch to the at least one surface of the electronic device based on the signal data in response to the signal data failing to meet the designated condition, and
resetting a baseline with other values associated with capacitances of nodes.

20. The electronic device of claim 19, wherein the designated condition includes a case in which at least part of the signal data is smaller than a negative first threshold.

21. The electronic device of claim 20, wherein the touch circuit is configured to, as part of discarding the signal data, discard the signal data of an area including a node having a value smaller than the negative first threshold.

22. The electronic device of claim 19, wherein the designated condition includes a case in which a number of nodes in which a magnitude of the signal data exceeds a second threshold exceeds a third threshold.

23. The electronic device of claim 22, wherein the touch circuit is configured to, as at least part of discarding the signal data, discard the signal data of an area including a node in which the magnitude of the signal data exceeds the second threshold.

24. The electronic device of claim 19, wherein the designated condition includes a case which a number of continuous failures to identify an action corresponding to an input based on the signal data is equal to or greater than a preset number, and
wherein the touch circuit is configured to, as at least part of discarding the signal data, discard the signal data during a set time period from when the designated condition is met.

25. An electronic device, comprising:
a processor; and
a touch circuit configured to output, to the processor, information associated with a touch to at least one surface of the electronic device,
wherein the touch circuit is configured to:
obtain first raw data including a first value associated with capacitance for each of a plurality of channels of the touch circuit,
obtain signal data based on the first raw data and a current first baseline, and
identify whether to reset the first baseline based on whether the signal data meets a designated condition,
wherein the designated condition includes a case in which the signal data is determined to include an erroneous touch or a case in which a second value of the signal data meets a preset threshold range, and
wherein the touch circuit is configured to delay the reset of the first baseline in response to the designated condition being met.

26. The electronic device of claim 25, wherein the touch circuit is configured to:
obtain second raw data including a third value associated with the capacitance for each of the plurality of channels, while the reset of the first baseline is delayed,
obtain new signal data based on the first baseline and the second raw data, and
reset the first baseline in response to the new signal data being determined to have an error.

27. The electronic device of claim 25, further comprising a memory,
wherein a memory stores information for a reference baseline obtained when there is no touch input, and
wherein the touch circuit is configured to, after resetting the first baseline to a second baseline, change the second baseline to the reference baseline based on a difference between values corresponding to a first channel and a second channel adjacent to each other in the second baseline exceeding a threshold or one or more channels in which a difference between the second baseline and the reference baseline exceeds the threshold.

28. The electronic device of claim 25, wherein the touch circuit is configured to:
obtain first signal data based on a first scheme,
obtain second signal data based on a second scheme,
identify information associated with a touch based on an errorless signal data among the first signal data and the second signal data in response to one of the first signal data and the second signal data having an error, and
adjust a parameter of a scheme in which the error has occurred.

29. The electronic device of claim 25, further comprising at least one sensor,
  wherein the processor is configured to:
  obtain the information associated with the touch to the at least one surface of the electronic device based on the signal data from the touch circuit,
  obtain sensing information from the at least one sensor, and
determine whether to discard the information associated with the touch received from the touch circuit based on the information associated with the touch received from the touch circuit and the sensing information obtained from the at least one sensor.

* * * * *